US00RE40361E

(19) United States
(12) Reissued Patent
Yamanaka et al.

(10) Patent Number: US RE40,361 E
(45) Date of Reissued Patent: Jun. 3, 2008

(54) DATA CONVERSION APPARATUS FOR DATA COMMUNICATION SYSTEM

(75) Inventors: Kiyokazu Yamanaka, Ashiya (JP); Kazuo Okamura, Toyonaka (JP); Junichi Hirai, Hirakata (JP); Hidekazu Tanigawa, Hirakata (JP); Chihiro Imagawa, Neyagawa (JP)

(73) Assignee: Matsushita Electric Industrial Co., Ltd., Osaka (JP)

(21) Appl. No.: 09/916,872

(22) Filed: Jul. 26, 2001

Related U.S. Patent Documents

Reissue of:
(64) Patent No.: 5,930,808
Issued: Jul. 27, 1999
Appl. No.: 08/865,092
Filed: May 29, 1997

(30) Foreign Application Priority Data

May 30, 1996 (JP) ..... 8-137103

(51) Int. Cl.
*G06F 17/00* (2006.01)

(52) U.S. Cl. ..... 715/501.1; 715/500.1
(58) Field of Classification Search ..... 707/500–530; 345/584–587, 619, 625, 667, 760; 715/500–530
See application file for complete search history.

(56) References Cited

U.S. PATENT DOCUMENTS 5,260,697 A * 11/1993 Barrett et al. ..... 345/173
5,398,183 A * 3/1995 Elliott ..... 600/509
5,481,712 A * 1/1996 Silver et al. ..... 717/109
5,504,917 A * 4/1996 Austin ..... 345/522
5,557,728 A * 9/1996 Garrett et al. ..... 345/801
5,577,030 A * 11/1996 Oki et al. ..... 710/33
5,634,124 A * 5/1997 Khoyi et al. ..... 707/103 R
5,745,360 A * 4/1998 Leone et al. ..... 707/513

FOREIGN PATENT DOCUMENTS

EP 0723369 A1 * 7/1996
EP 0723369 * 7/1996
JP 9-148994 6/1997
JP 997265 * 8/1997
JP 99160 * 10/1997

OTHER PUBLICATIONS

USIPS (User–System Interface Prototyping System): A System for Evaluation and Development of Workstation Software for $C^3$ Applications, IEEE 1984.*
"Consumer Electronics", T.S. Perry, IEEE Spectrum, vol. 34, No. 1, Jan. 1997.*
P. Rubin et al., "USIPS (User System Interface Prototyping System) A System for Evaluation and Development of Workstation Software for C Applications", IEEE, 1984.*
T.S. Perry, "Consumer Electronics", IEEE Spectrum, vol. 34, No. 1 Jan. 1997.*

* cited by examiner

*Primary Examiner*—Alford W. Kindred

(57) ABSTRACT

A data conversion apparatus is provided as a data transmitting apparatus in a data communication system which achieves pseudo interactive communications by using one-way communications between the data transmitting apparatus and a plurality of data receiving apparatuses. The data conversion apparatus converts documents stored inside into images to be displayed on the screen, such as a TV screen. In doing so, if the document includes character strings or image information as link destination information which specifies another document as a link destination, the data conversion apparatus adds a supplementary design into the image of the link destination information for the viewer to recognize such information.

31 Claims, 36 Drawing Sheets

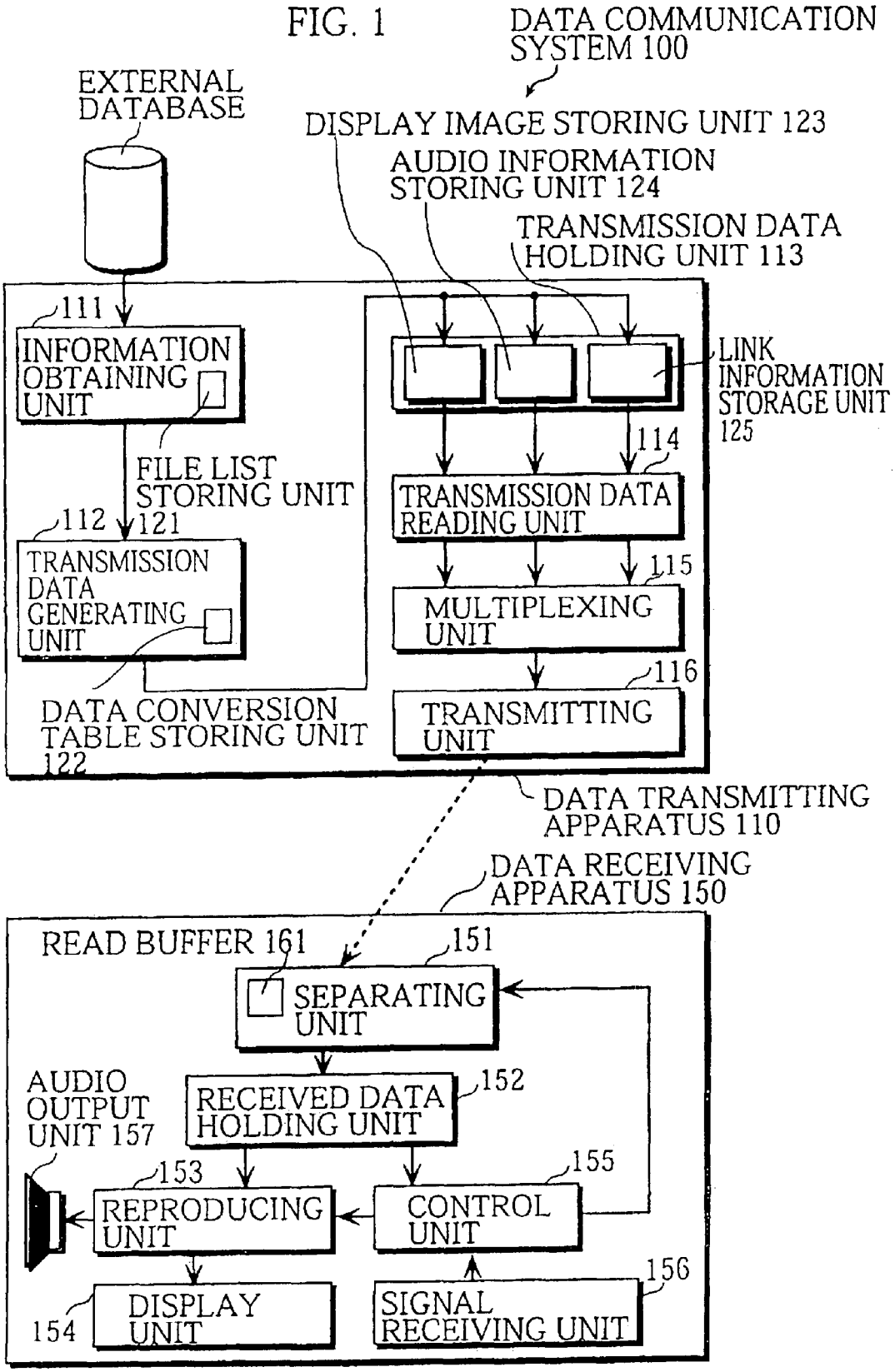
FIG. 1
DATA COMMUNICATION SYSTEM 100
EXTERNAL DATABASE
DISPLAY IMAGE STORING UNIT 123
AUDIO INFORMATION STORING UNIT 124
TRANSMISSION DATA HOLDING UNIT 113
111
INFORMATION OBTAINING UNIT
LINK INFORMATION STORAGE UNIT 125
114
FILE LIST STORING UNIT 121
112
TRANSMISSION DATA READING UNIT
TRANSMISSION DATA GENERATING UNIT
115
MULTIPLEXING UNIT
116
DATA CONVERSION TABLE STORING UNIT 122
TRANSMITTING UNIT
DATA TRANSMITTING APPARATUS 110
DATA RECEIVING APPARATUS 150
READ BUFFER 161
151
SEPARATING UNIT
AUDIO OUTPUT UNIT 157
RECEIVED DATA HOLDING UNIT
152
153
155
REPRODUCING UNIT
CONTROL UNIT
156
154
DISPLAY UNIT
SIGNAL RECEIVING UNIT

FIG. 2

FILE LIST 200

| SERIAL NO. (201) | ADDRESS (202) | FILE NAME (203) |
|---|---|---|
| 0001 | http : //www.wbc.com/main | Report.html<br>Weather.gif<br>Weather.au |
| 0002 | http : //www.wbc.com/sub1 | Tokyo.html |
| 0003 | http : //www.wbc.com/sub1 | Osaka.html |
| . . . | . . . | . . . |

FIG. 3

HTML DOCUMENT
301

```
311 ⟨HTML⟩
312 ⟨H1⟩ WEATHER REPORT ⟨/H1⟩
313 ⟨CENTER⟩
314 ⟨IMG SRC="Weather. gif"⟩
315 ⟨/CENTER⟩
316 ⟨P⟩ TOMORROW,THE WHOLE OF JAPAN WILL ENJOY
317 SPRINGLIKE WEATHER ⟨/P⟩
318 ⟨UL⟩
319 ⟨LI⟩ ⟨A HREF="Tokyo. html"⟩ TOKYO ⟨/A⟩
320 ⟨LI⟩ ⟨A HREF="Osaka. html"⟩ OSAKA ⟨/A⟩
321 ⟨LI⟩ ⟨A HREF="Weather. au"⟩ AUDIO INFORMATION ⟨/A⟩
322 ⟨/UL⟩
323 ⟨/HTML⟩
```

Report. html

401 IMAGE INFORMATION

Weather. gif

HTML DOCUMENT 501

```
〈HTML〉
〈H1〉 TOKYO WEATHER 〈/H1〉
〈UL〉
〈LI〉 TOMORROW－FINE
〈LI〉 DAY AFTER TOMORROW－FINE
〈/UL〉
〈LI〉 〈A HREF＝"Report.html"〉 RETURN 〈/A〉
〈/HTML〉
```

511

Tokyo.html

FIG. 6

HTML DOCUMENT 601

```
〈HTML〉
〈H1〉 OSAKA WEATHER 〈/H1〉
〈UL〉
〈LI〉 TOMORROW－FINE
〈LI〉 DAY AFTER TOMORROW－FINE
〈/UL〉
〈LI〉 〈A HREF＝"Report.html"〉 RETURN 〈/A〉
〈/HTML〉
```

611

Osaka.html

FIG. 7

LINK INFORMATION TABLE 700

| | FORMAT |
|---|---|
| INDEX INFORMATION | 〈INDEX=9999〉 |
| HOT SPOT INFORMATION | 〈HOTSPOT X=999,Y=999,GO_TO_PAGE(9999)〉 |

701

702

( "9" REPRESENTS A DECIMAL DIGIT)

FIG. 16

| CURSOR NO. | DISPLAY POSITION(X,Y) |
|---|---|
| 1 | (100, 600) |
| 2 | (100, 700) |
| 3 | |
| 4 | |
| 5 | |

FIG. 17

DESIGN INFORMATION

| CURSOR NO. | SELECTED | NOT SELECTED |
|---|---|---|
| 1 | 1 | 1 |
| 2 | 2 | 2 |
| 3 | 3 | 3 |
| | | |

FIG. 23

2306 2302 2301 2304 2303 2305

```
<HTML>
<H1>WEATHER REPORT</H1>
<CENTER>
<IMG SRC= "Weather.gif" >
</CENTER>
<P>TOMORROW,THE WHOLE OF JAPAN WILL ENJOY SPRINGLIKE WEATHER</P>
<UL>
<LI><A HREF= "Osaka.html" >OSAKA</A>
<LI><A HREF= "Tokyo.html" >TOKYO</A>
<LI><A HREF= "Nagoya.html" >NAGOYA</A>
<LI><A HREF= "Sendai.html" >SENDAI</A>
<LI><A HREF= "Hiroshima.html" >HIROSHIMA</A>
<LI><A HREF= "Fukuoka.html" >FUKUOKA</A>
<LI><A HREF= "Sapporo.html" >SAPPORO</A>
</UL>
<P>WORLD WEATHER REPORT</P>
<UL>
<LI><A HREF= "North.html" >NORTHERN HEMISPHERE</A>
<LI><A HREF= "South.html" >SOUTHERN HEMISPHERE</A>
</UL>
</HTML>
```

2309 Report.html

2308

2307

2401

```
<HTML>
<H1>OSAKA WEATHER</H1>
<UL>
<LI>TOMORROW−FINE
<LI><A HREF="Osaka_week.html">WEATHER FOR WEEK</A>
<LI><A HREF="Osaka_month.html">WEATHER FOR MONTH</A>
</UL>
<LI><A HREF="Report.html">RETURN</A>
</HTML>
```

Osaka.html

FIG. 28

2802 2803 2801 2804

| TAG | STARTING POSITION | FONT SIZE |
|---|---|---|
| <H1> | x=10<br>y=10 | (80,80) |
| <P> | x = 10 | (30,60) |
| <LI> | x = 10 | (30,60) |
| ⋮ | ⋮ | ⋮ |

FIG. 29

2901

| BEFORE CONVERSION | AFTER CONVERSION |
|---|---|
| FILE NAME | Index( "FILE NAME" ) |
| <A HREF= "FILE NAME" > | HotSpot(M "FILE NAME" ) |
| ⋮ | ⋮ |

2902

2903

3002 3001 3003

| INDEX NO. | CURSOR DESIGN |
|---|---|
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |

FIG. 32

2 TOKYO
3 NAGOYA
4 SENDAI
5 HIROSHIMA
6 FUKUOKA
7 SAPPORO
WORLD WEATHER REPORT
8 NORTHERN HEMISPHERE
9 SOUTHERN HEMISPHERE

3202

3201

FIG. 33

```
Index(" Report.html" )
HotSpot(1," Osaka.html" )
HotSpot(2," Tokyo.html" )
HotSpot(3," Nagoya.html" )
HotSpot(4," Sendai.html" )
HotSpot(5," Hiroshima.html" )
HotSpot(6," Fukuoka.html" )
HotSpot(7," Sapporo.html" )
HotSpot(8," North.html" )
HotSpot(9," South.html" )
```

3301

3701

```
Index(" Report.html" )
HotSpot(1," Osaka.html" )
HotSpot(2," Tokyo.html" )
```

FIG. 38

1 NAGOYA
2 SENDAI
3 HIROSHIMA
4 FUKUOKA
5 SAPPORO

WORLD WEATHER REPORT
6 NORTHERN HEMISPHERE

3801

```
Index(" Report1.html" )
HotSpot(1," Nagoya.html" )
HotSpot(2," Sendai.html" )
HotSpot(3," Hiroshima.html" )
HotSpot(4," Fukuoka.html" )
HotSpot(5," Sapporo.html" )
HotSpot(6," North.html" )
```

3802

FIG. 41

1 NAGOYA
2 SENDAI
3 HIROSHIMA
4 FUKUOKA
5 SAPPORO

4101

```
Index(" Report1.html" )
HotSpot(1," Nagoya.html" )
HotSpot(2," Sendai.html" )
HotSpot(3," Hiroshima.html" )
HotSpot(4," Fukuoka.html" )
HotSpot(5," Sapporo.html" )
```

4102

FIG. 42

WORLD WEATHER REPORT

1 NORTHERN HEMISPHERE

2 SOUTHERN HEMISPHERE

4201

```
Index(" Report2.html" )
HotSpot(1," North.html" )
HotSpot(2," South.html" )
```

4202

DATA CONVERSION APPARATUS FOR DATA COMMUNICATION SYSTEM

Matter enclosed in heavy brackets [ ] appears in the original patent but forms no part of this reissue specification; matter printed in italics indicates the additions made by reissue.

BACKGROUND OF THE INVENTION (1) Field of the Invention

This invention relates to a data conversion apparatus used for TV broadcasting systems, and more specifically to a data conversion apparatus for converting HTML (Hyper Text Markup Language) documents into information of a format suitable for the TV broadcasting systems.

(2) Description of the Prior Art

In recent years, the Internet has become a very popular system for obtaining or exchanging information. A great number of users view information stored in each site called home page on the WWW (World Wide Web). In doing so, users make interactive operations on the home pages using a keyboard or a mouse. In particular, users can move a pointer using a keyboard or mouse to select "hot spots," which results in a jump to another screen. One example of such interactive operation techniques is Netscape Navigator developed by Netscape Communications Corporation.

Conventional interactive operation techniques have been created on the assumption that a pointing device, such as a keyboard or mouse, which are peripheral devices of computers, is used to input instructions, not a remote controller of a TV set. That means, it is difficult to use such remote controllers for the interactive operations required on the home pages on the WWW in the Internet.

SUMMARY OF THE INVENTION

It is therefore the object of the present invention to provide a data conversion apparatus for multimedia data which enables interactive operations on home pages displayed on the TV screen by using a remote controller of the TV set.

The above object is achieved by a data conversion apparatus which is used as a data transmitting apparatus in a data communication system, where the data communication system achieves pseudo interactive communications by using one-way communications between the data transmitting apparatus and a plurality of data receiving apparatuses, the data conversion apparatus including: document storing unit for storing a plurality of documents each of which includes at least a character string and at least a piece of image information, where at least one of the character string and the piece of image information includes a piece of link destination information which specifies another document as a link destination; supplementary design storing unit for storing a list of supplementary designs with serial numbers respectively related to the supplementary designs; display image element generating unit for reading the character string and the piece of image information one at a time from the document storing unit and converting the character string and the piece of image information into respective display image elements, where the display image elements are bit-mapped graphics; display image generating unit for generating a display image which is composed of the display image elements, when the display image has a size which is equivalent to a size of display screens of the plurality of data receiving apparatuses; supplementary design adding unit for reading a supplementary design corresponding to the piece of link destination information specifying the other document as the link destination from the supplementary design storing unit and adding the supplementary design to a corresponding display image element in the display image; and display link destination information converting unit for converting the piece of link destination information specifying the other document as the link destination into a piece of display link destination information, the piece of display link destination information being related to a serial number corresponding to the supplementary design added by the supplementary design adding unit, where the piece of display play link destination information specifies, as a link destination, another display image which is a display image of the other document generated by the display image generating unit.

With such a construction, since the display image elements respectively linked to other display images are visually emphasized by the supplementary designs, the user can easily find and such display image elements on the display screen. Also, with the serial numbers attached to the supplementary designs, the user can specify a desired link-destination display image by using, for example, a remote controller of a TV set.

In the above data conversion apparatus, the display image element generating unit may include: a conversion table storing unit for storing a character size of the character string; and a display image element generating unit for converting the character string into a display image element according to the character size and converting the piece of image information into a display image element.

In the above data conversion apparatus, the conversion table storing unit may further store respective starting positions in a horizontal direction of the display image elements, where the display image generating unit includes: a display position calculating unit for reading the starting positions of the display image elements and calculating respective display positions of the display image elements in the display image; and a display image generating unit for generating the display image by arranging the display image elements in the display image according to the display positions.

In the data conversion apparatus, the display image generating unit generates a plurality of display sub-images from the document, where the display link destination information converting unit includes: a display link destination information generating unit for generating a plurality sets of pieces of display link destination information which respectively correspond to the plurality of display sub-images generated from the document.

With such a construction, since pairs of a display image and a piece of display link destination information are held inside the data conversion apparatus, the user can easily operate on display screens such as TV screens on which the scrolling function cannot be used.

In the data conversion apparatus, the supplementary design storing unit may include: a maximum number storing unit for storing a maximum number of the supplementary designs in the display image, where the display image generating unit further includes: a maximum number judging unit for judging whether the number of the supplementary designs to be arranged in the display image exceeds the maximum number; and a display image dividing unit for, when the maximum number judging unit judges that the number of the supplementary designs exceeds the maximum number, sending an instruction to the display image generating unit to divide the display image into the plurality of display sub-images so that supplementary designs less than the maximum number are added to each of the plurality of display sub-images divided from the display image, where the display image generating unit generates the plurality of display sub-images according to the instruction.

In the data conversion apparatus, the display link destination converting unit may further include: a display link destination sub-information generating unit for generating a plurality sets of pieces of display link destination sub-information which respectively correspond to the plurality of display sub-images generated by the display image generating unit.

With such a construction, since the number of display image elements linked to other display images in a display screen are limited to a certain number, the user can easily specify a desired link-destination display image by using, for example, a remote controller of a TV set.

In the data conversion apparatus, the display image generating unit may generate the plurality of display sub-images so that each of the plurality of display sub-images includes display image elements of a same category.

In the data conversion apparatus, the document may be written in HTML, where the display image generating unit determines categories of the display image elements from tags written in the document.

With such a construction, display image elements in a document in the same category are displayed on the screen as a group. This is convenient for the user when switching screens.

The data conversion apparatus may further include: information obtaining unit for obtaining, via a communication line, a document written in HTML (Hyper Text Markup Language) which includes at least a character string and at least a piece of image information; and information writing unit for writing the document written in HTML into the document storing unit.

The above data conversion apparatus may further include: first storing unit for storing a plurality of video frames which, each having an identifier, are the display image and the plurality of display sub-images; second storing unit for storing a plurality sets of pieces of display link destination information which are generated by the display link destination information converting unit and are respectively related to the plurality of video frames, where each of the plurality sets of pieces of display link destination information having the same identifier as the identifier of a corresponding video frame; and broadcasting unit for cyclically transmitting a certain number of video frames in the first storing unit and corresponding sets of pieces of display link destination information in the second storing unit.

With such a construction, it is possible for the user to perform pseudo interactive communications with one-way communications in which data is transmitted from the data transmission apparatus.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 1 is a block diagram showing the construction of the data communication system of the present invention described in the first embodiment;

FIG. 2 shows an example of the file list stored in the file list storing unit in the first embodiment;

FIG. 3 shows HTML document 301 "Report.html" which is the first page of a home page provided by a WWW server in the first embodiment;

FIG. 6 shows HTML document "Osaka.html" which is an image displayed on the third page of the home page in the first embodiment;

FIG. 7 shows an example of the link information table stored in the data conversion table storing unit in the first embodiment;

FIG. 16 shows an example of the cursor design correspondence table which the control unit in the first embodiment generates to control the display position of the cursor design;

FIG. 17 shows an example of the design information stored by the control unit in the first embodiment;

FIG. 23 shows an example document stored in the information obtaining unit in the second embodiment;

FIG. 28 shows a font table stored in the data conversion table storing unit in the second embodiment;

FIG. 29 shows a link information conversion table stored in the data conversion table storing unit in the second embodiment;

FIG. 32 shows an example image having been converted and stored in the temporary information storage unit in the second embodiment;

FIG. 33 shows an example piece of link information stored in the temporary information storage unit in the second embodiment;

FIG. 38 shows an image and a piece of link information stored in the temporary information storage unit in the third embodiment;

FIG. 41 shows an image and a piece of link information stored in the temporary information storage unit in the fourth embodiment;

FIG. 42 shows an image and a piece of link information stored in the temporary information storage unit in the fourth embodiment.

DESCRIPTION OF THE PREFERRED EMBODIMENTS

First Embodiment

Figures 4, 5:
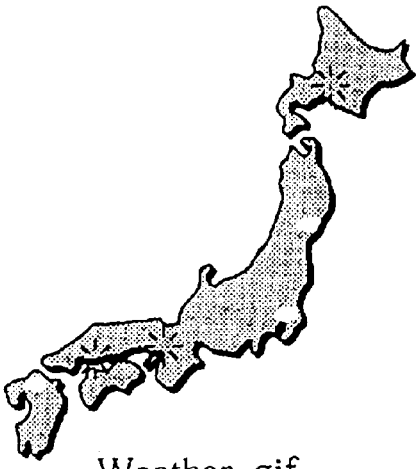
FIG. 4 shows image information "Weather.gif" which is an image displayed on the first page of the home page in the first embodiment.
FIG. 5 shows HTML document "Tokyo-html" which is an image displayed on the second page of the home page in the first embodiment.

FIG. 1 is a block diagram showing the construction of the data communication system 100 which is described in the present embodiment. This data communication system 100 is composed of a data transmitting apparatus 110 and a plurality of data receiving apparatuses 150.

The data transmitting apparatus 110 includes an information obtaining unit 111, a transmission data generating unit 112, a transmission data holding unit 113, a transmission data reading unit 114, a multiplexing unit 115, and a transmitting unit 116.

Each data receiving apparatus 150 includes a separating unit 151, a received data holding unit 152, a reproducing unit 153, a display unit 154, a control unit 155, a signal receiving unit 156, and an audio output unit 157.

Construction of the Information Obtaining Unit 111

The information obtaining unit 111 includes a file list storing unit 121 and a buffer (not-illustrated) which holds information obtained from an external database, such as a WWW server. The file list storing unit 121 stores a file list 200 in which the file names of files that are to be obtained by the information obtaining unit 111 and the addresses of these files are stored corresponding to serial numbers which show the order in which the files are to be obtained.

FIG. 2 shows an example of the file list 200 stored in the file list storing unit 121. In the file names given in this list, the extension "html" indicates that a file is an HTML document, the extension "gif" indicates that a file is an image which has been compressed according to GIF (Graphics Interchange Format), and the extension "au" indicates that a file is audio information in AU format.

This file list 200 shown in FIG. 2 shows the case when the information obtaining unit 111 is connected to the Internet and obtains information from WWW servers. In this example, the file list 200 is a table in which the URL (Uniform Resource Locator) of a directory on a WWW server is stored in the address column 202 corresponding to each number in the serial number column 201. In the present example, each page in a home page provided by a WWW server can be composed of an HTML document and image files and audio files whose file names are indicated by the HTML document. As a result, the file name of the HTML document for each page is grouped together with the file names of the accompanying image information files and audio files in the file name column 203 of the file list 200.

It should be noted that there can be cases when the address and file names stored in file list storing unit 121 for each serial number in the file list do not need to be recorded separately, so that they may instead be represented using a single URL. It is also possible for files to be obtained not from a WWW server, but from an external database. In this case, the address of the file is expressed as the address of a device in the external database and the file is expressed by a file address in the database.

The information obtaining unit 111 reads a URL and the file names which are to be obtained from the URL from the file list storing unit 121 in ascending order of the serial numbers in column 201. It then accesses the WWW server indicated by the URL to obtain the indicated files. The information obtaining unit 111 assigns file names to the obtained files and stores the files in the buffer.

Examples of files

The files obtained by the information obtaining unit 111 are described below, with reference to FIGS. 3, 4, 5, and 6.

FIG. 3 shows the HTML document 301 "Report.html" which is the first page of a home page provided by a WWW server. The notation 'HTML document 301 "Report.html" indicates the file of HTML document 301 whose file name is "Report.html."

In HTML documents, character strings written inside "<>" brackets are called tags. These tags represent control codes and are used in pairs written as "<character string>" and "</character string>". The control codes in tags indicate the execution of a corresponding control operation.

Tags "<HTML>" on line 311 and "</HTML>" on line 323 in FIG. 3 indicate that the character strings between these tags form a single HTML document 301.

Tags "<H1>" and "</H1>" on line 312 indicate that the character string "WEATHER REPORT" between these tags is the headline of this document.

Tags "<CENTER>" on line 313 and "</CENTER>" on line 315 indicate that the part of the document expressed by the character strings between these tags should be centered.

'<IMG SRC="Weather.gif">' on line 314 indicates that the image information 401 "Weather.gif" shown in FIG. 4 is to be displayed in the document. Here, "SRC=" is an attribute of tag "<IMG>" and indicates an image information file. The attribute content of "SRC=" is "Weather.gif", indicating a file name.

FIG. 4 shows the image information 401 "Weather.gif" which is an image displayed on the first page of the home page.

As shown in FIG. 4, the image information 401 stored in image information file "Weather.gif" is a map of Japan which includes weather information.

Tags "<P>" on line 316 and "</P>" on line 317 indicate that the character string "TOMORROW, THE WHOLE OF JAPAN WILL ENJOY SPRINGLIKE WEATHER" between these tags is a single paragraph.

Tags "<UL>" on line 318 and "</UL>" on line 322 indicate that the display items expressed by the character strings between these tags are displayed as an itemized list without serial numbers.

Each of the tags "<L1>" on lines 319 and 320 indicates that the character string between this tag and the next "<L1>" or "</UL>" forms an item in the itemized list.

'<A HREF="Tokyo.html">TOKYO </A>' on line 319 of FIG. 3 indicates that the character string "TOKYO" is linked to the HTML document 501 "Tokyo.html" which is shown in FIG. 5. Here, character strings or images which are linked to other files, such as this character string "TOKYO", are called hot spots or anchor points. As one example, if a user uses the mouse to select the hot spot "TOKYO" which displayed on a computer monitor by a browser, the HTML document 501 "Tokyo.html" will be read by the browser and is displayed on the screen. Here, the attribute of tag "<A>", "HREF=", represents a link destination, and the attribute content of "HREF=", in this case "Tokyo.html", indicates a file name for the link destination file.

'<A HREF="Osaka.html">OSAKA </A>' on line 320 of FIG. 3 indicates that the character string "OSAKA" is linked to the HTML document 601 "Osaka.html" which is shown in FIG. 6. Accordingly, this character string "OSAKA" is also a hot spot. If hot spot "OSAKA" is selected, HTML document 601 "Osaka.html" will be displayed on the screen.

'>A HREF="Weather.au">AUDIO INFORMATION </A>' on line 321 of FIG. 3 indicates that the character string "AUDIO INFORMATION" is linked to the audio file "Weather.au.", making it another hot spot. If the hot spot "AUDIO INFORMATION" is selected, the audio file "Weather.au." will be reproduced.

FIG. 5 shows the HTML document 501 "Tokyo.html" which is the second page of the home page. The tags included in the HTML document 501 have already been explained, so that the following explanation will only deal with the links to other pages.

'<A HREF="Report.html">RETURN </A>' on line 511 of FIG. 5 indicates that the character string "RETURN" is linked to the HTML document 301 "Report.html" which is shown in FIG. 3.

FIG. 6 shows the HTML document 601 "Osaka.html" which is the third page of the home page.

'<A HREF="Report.html">RETURN </A>' on line 611 of FIG. 6 indicates that the character string "RETURN" is linked to the HTML document 301 "Report.html" which is shown in FIG. 3.

The information obtaining unit 111 may obtain all the files listed in the file list 200 in order and store all of the obtained files in its buffer. Alternatively, the information obtaining unit 111 may obtain the listed files in units of one page and store the obtained files in the buffer. In this latter case, the files for a next page are only obtained after the processing of a current page has been completed by the transmission data generating unit 112.

Construction of Transmission Data Generating Unit 112

The transmission data generating unit 112 includes a data conversion table storing unit 122 and a storage area (not shown in the drawings) which is used as the work area for generating transmission data. The data conversion table storing unit 122 includes a tag table, font files, and a link information table. The tag table is a list of control operations for every available HTML tag which each has its own flag. The font files each include character fonts for TV display which are classified for different purposes. The link information table is a table which expresses the link information for hot spots in a format recognized by the data communication system 100. The work area is composed of a file storage area, a tag storage area, a character string storage area, and a flag storage area. The file storage area stores one HTML document file. The tag storage area stores the character strings which are written inside the "<>" brackets of each tag. The character string storage area stores character strings other than the ones between the "<>" brackets. The flag storage area is an area where flags which are used for controlling the generation of display image information for one frame of image data are set. The character strings stored in the tag storage area and the character string storage area are deleted when the control operations corresponding to the tags (flags) have been completed. If a plurality of flags are present in the flag storage area, the flags are set in ascending order and are reset in descending order.

FIG. 7 shows an example of the link information table 700 stored in the data conversion table storing unit 122, where the numbers, such as "9", are decimal values.

As shown in FIG. 7, the link information stored in the link information table 700 is composed of index information 701 and hot spot information 702.

Index information 701 is composed of an information identification part "INDEX=" for identifying the information as index information and a file identification number expressed as a four-figure decimal value. This file identification number is the identification number of a transmission data file which includes the current piece of index information 701.

Hot spot information 702 is composed of an information identification part "HOTSPOT=" for identifying the information as hot spot information, X-Y coordinates "X=999, Y=999", for indicating a cursor position in the current display screen, an instruction "GO_TO_PAGE" which corresponds to the cursor position given by these coordinates, and a four-figure decimal variable showing the identification number of the transmission file linked to this cursor position.

The transmission data generating unit 112 treats one set of the display image information to be generated along with the accompanying audio information and link information as a single transmission data file, based on one HTML document. Here, the transmission data generating unit 112 establishes a storage area in each of the display image information storing unit 123, the audio information storing unit 124, and the link information storing unit 125 which are provided in the transmission data holding unit 113 (described later) so that the display image information, audio information, and link information to be included in one transmission data file are interrelatedly stored. Hereinafter, the storage areas in the display image information storing unit 123, the audio information storing unit 124, and the link information storing unit 125 are respectively called the display image information storage area, the audio information storage area, and the link information storage area.

The transmission data generating unit 112 assigns a same identification number to the display image information storage area, the audio information storage area, and the link information storage area used for storing the corresponding kinds of information in a same transmission data file. Here, the transmission data generating unit 112 manages the audio information and link information in a same transmission data file as separate files which are given the same identification number. This identification number may correspond to the serial number in column 201 of the file list, which in turn corresponds to the file names of the present files which are given in column 203.

The transmission data generating unit 112 fetches an unprocessed HTML document file which has been obtained by information obtaining unit 111 from the buffer in the information obtaining unit 111 in accordance with the serial number 201 in the file list 200. The transmission data generating unit 112 then writes the file into the file storage area of the work area, in addition to generating the index information in accordance with the format of the index information 701 of the link information table 700. This generated index information is then stored at the front of the link information storage area in the transmission data holding unit 113.

The transmission data generating unit 112 reads the tags in order from the start of the HTML document and interprets the tags by looking each tag up in the tag table to find the corresponding control operations. This interpretation of control operation is performed by writing a character string detected after a tag start sign "<" one character at a time into the tag storage area provided in the work area until a tag end sign ">" is detected. The transmission data generating unit 112 then matches the character string in the tag storage area with a tag written in the tag table.

For tags which are not "<A>", "<IMG>", or "<character string preceded by '/'>", the transmission data generating unit 112 sets a flag showing the interpreted control operation in the flag storage area provided in the work area and stores the character strings between the start tag "<>" and the corresponding end tag "</>" into the character string storage area in the work area so as to correspond to the set flag. The storage of character strings between a pair of corresponding tags is performed in the same way as the storage of the character strings included inside the tags themselves. The transmission data generating unit 112 converts the character strings in the character string storage area into text image using the fonts in one of the font files and arranges the text image in accordance with the control operation represented by the current flag to generate display image information. This generated display image information is then added to the display image information storage area provided in the transmission data holding unit 113. Here, when a start tag "<character string>" is followed, not by a character string, but by another start tag "<another character string>", a flag is first set for the former tag in the flag storage area, before the processing is performed for the control operation indicated by the latter tag.

If the read tag is "<IMG>", the transmission data generating unit 112 fetches the image information file with the file name specified by the attribute "SRC=" from the buffer of the information obtaining unit 111, and decompresses the image information file under the format specified by the file name extension to convert the format of the image into an appropriate image data format, such as bitmap data or graphics data.

If, for example, the file name extension is ".gif", the transmission data generating unit 112 decompresses the image information file under GIF to convert the image information file into the appropriate format. If a preceding flag is set for a control operation to be performed on the converted image, the converted image is arranged in accordance with this control operation to generate display image information, otherwise the display image information is generated with the converted image being arranged in accordance with an initial setting. This generated display image information is then added to the display image information storage area.

If the read tag is "<A>", the transmission data generating unit 112 checks to see if the "link destination file" specified by attribute "HREF=" of "<A>" is an audio file which has a file name extension, such as "au", which indicates audio information. If the link destination file is an audio file, the transmission data generating unit 112 fetches the audio file from the buffer of the information obtaining unit 111 and converts the audio information into audio data of a predetermined format, before storing it in the audio information storage area.

If the link destination file is not an audio file, the transmission data generating unit 112 generates a text image for the character string between tags <A>and </A>, and arranges the text image at a display position indicated by a preceding flag, or alternatively at a display position specified by an initial setting, with a space being reserved for displaying a cursor. By doing so, the transmission data generating unit 112 generates display image information which is then added to the display image information storage area provided in the transmission data holding unit 113. The transmission data generating unit 112 then calculates the X-Y coordinates for the space reserved for the cursor display position and refers to the hot spot information 702 in the link information table 700 to generate hot spot information from the calculated X-Y coordinates and the "link destination file name" specified by the attribute "HREF=" of tag "<A>". In doing so, the transmission data generating unit 112 refers to the file list 200 and finds the serial number 201 corresponding to the file name in column 203 which in turn corresponds to the link destination file name of tag "<A>", before writing this serial number 201 into the hot spot information as the file identification number. If the link destination file name is not present in the file list 200, the transmission data generating unit 112 writes the file name of the current file into the hot spot information. After doing so, the transmission data generating unit 112 adds the generated hot spot information to the link information storage area provided in the transmission data holding unit 113.

After completing all of the above processes for an HTML document, the transmission data generating unit 112 writes a graphic representation of the identification number of the display image information area at a predetermined position in the non-displayed area of the display image information stored in the display image information area. In the present embodiment, the identification number has been described as being a four-figure decimal value, although the number of decimal digits is not limited to four. The identification number may alternatively be represented in binary notation, as a combination of numerals, characters and symbols, as a graphical figure, as a bar code, or even as a file name. Here, the audio information stored in the audio information storage area and the link information stored in the link information storage area are also appended with the identification numbers of the corresponding storage areas, in the same way as with standard digital data files.

Through the processes described above, the transmission data generating unit 112 generates a first, second, and third page of transmission data 800, 900, and 1000, which are respectively the first, second, and third pages of the home page provided by the WWW server, from the HTML document 301, the audio information not shown in the drawings, the image information 401, the HTML document 501, and the HTML document 601.

Transmission Data Generated by

The Transmission Data Generating Unit 112

Figure 8A:
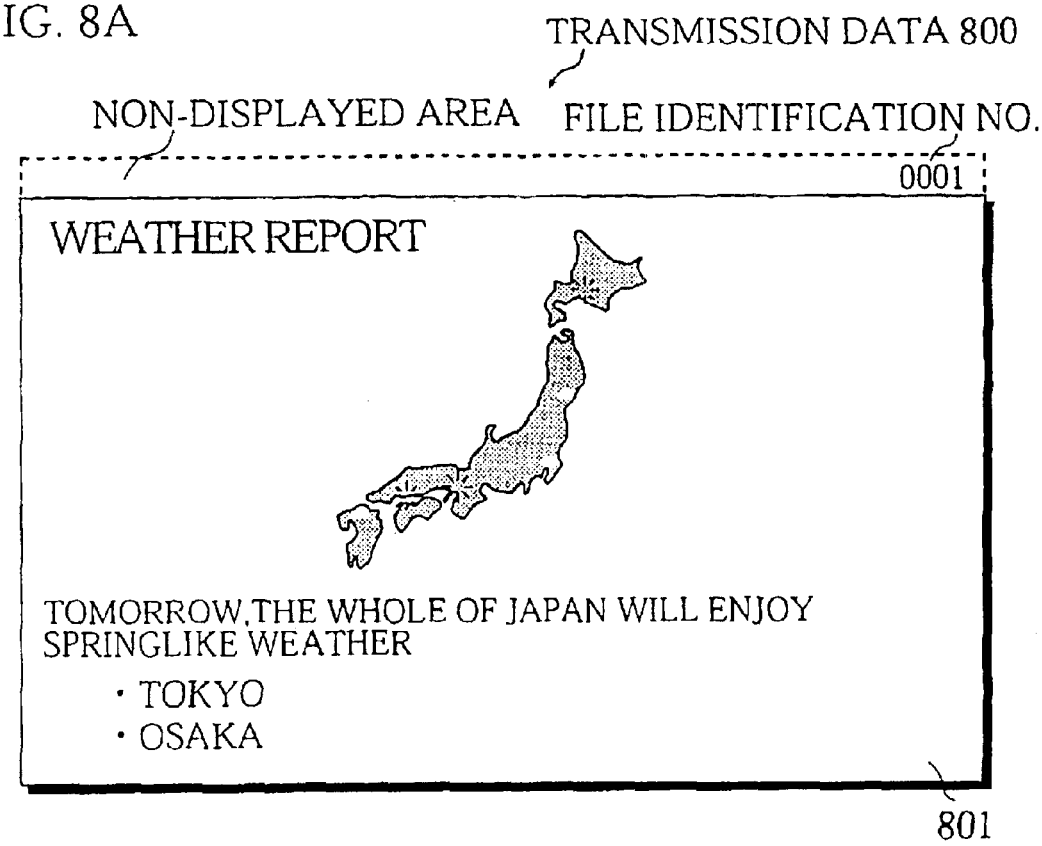
FIG. 8A shows the display image information in the first page of the home page in the first embodiment.
Figure 8B:
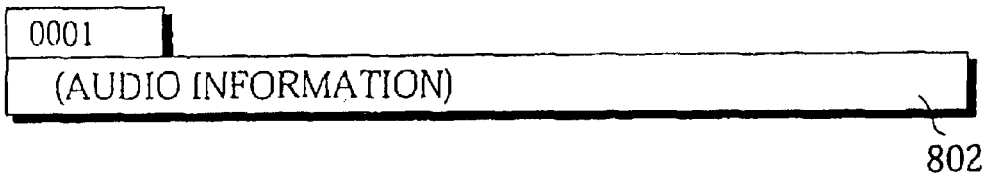
FIG. 8B shows the audio information in the first page of the home page in the first embodiment.
Figure 8C:
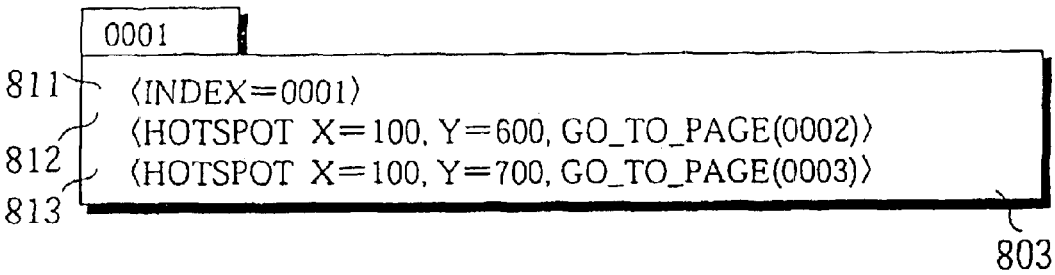
FIG. 8C shows the link information in the first page of the home page in the first embodiment.
Figure 9A:
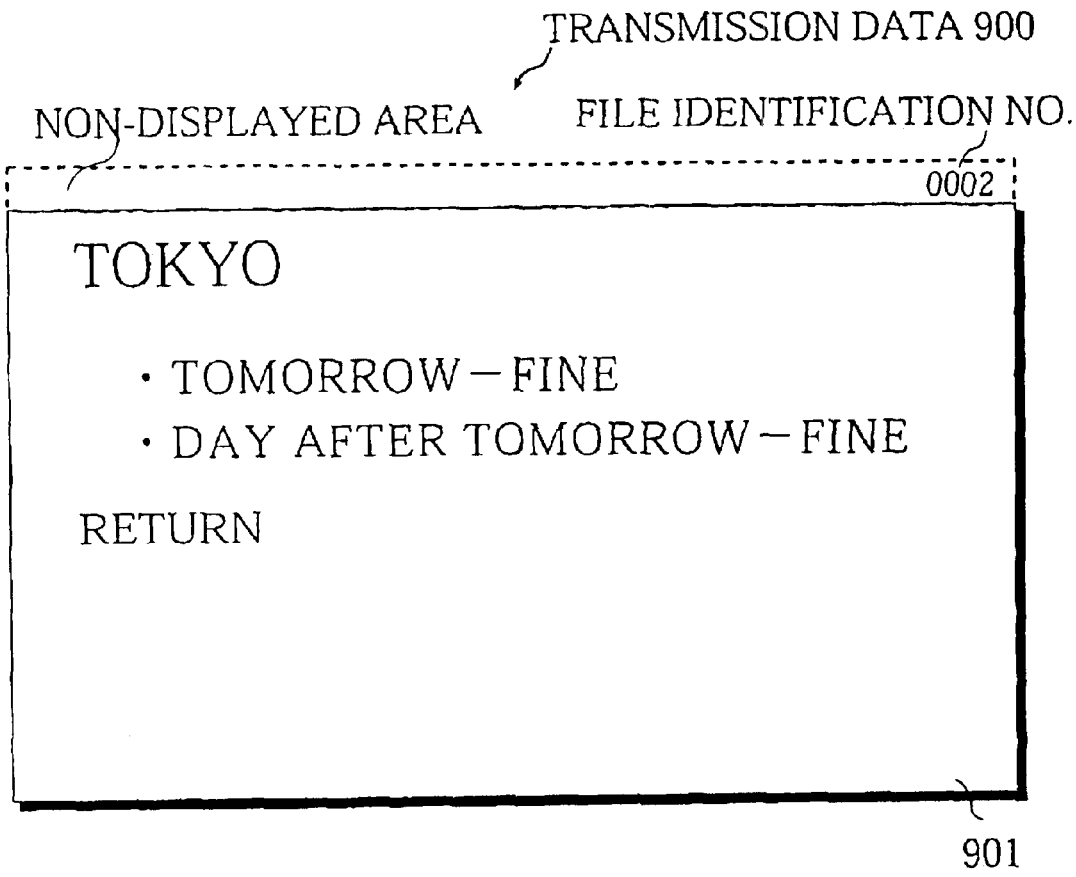
FIG. 9A shows the display image information in the second page of the home page in the first embodiment.
Figure 9B:
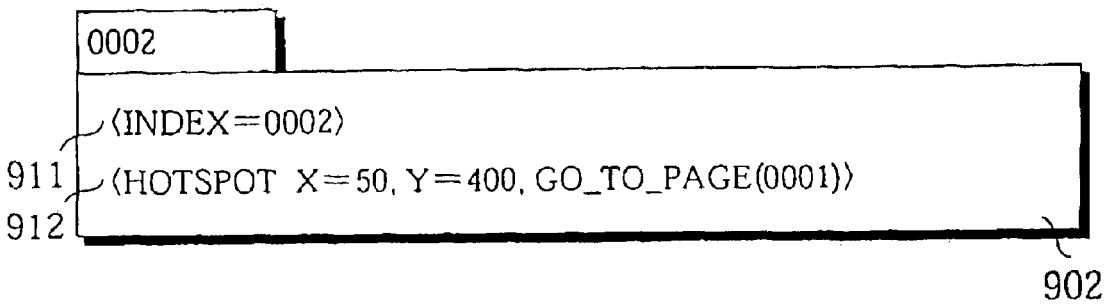
FIG. 9B shows the link information in the second page of the home page in the first embodiment.
Figure 10A:
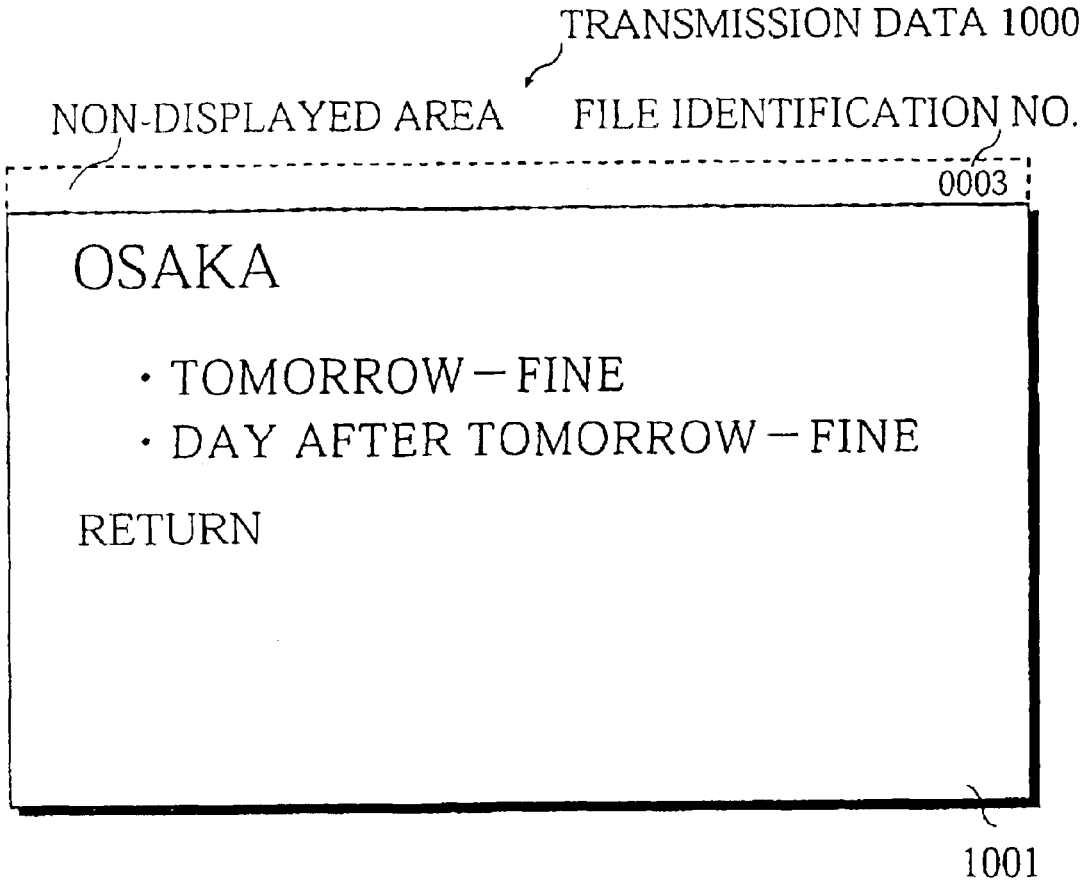
FIG. 10A and FIG. 10B show the transmission data which is the third page of the home page in the first embodiment.
Figure 10B:
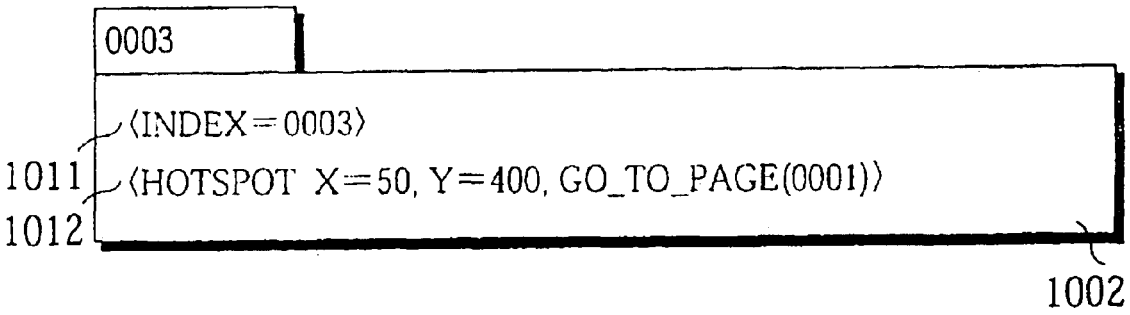

FIGS. 8A to 8C show the transmission data 800 that is the first page of the home page provided by the WWW server. This first page of transmission data 800 has been generated from the HTML document 301, the audio information "Weather.au," and the image information 401. FIGS. 9A and 9B show the transmission data 900 that is the second page of the home page provided by the WWW server which has been generated from the HTML document 501. FIGS. 10A and 10B show the third page of transmission data 1000 that is the third page of the home page which has been generated from the HTML document 601. As shown in FIGS. 8A to 8C, the transmission data 800 includes the display image information 801, the audio information 802, and the link information 803 which is related to display image information 801. Here, FIG. 8A shows the display image which is the content of the display image information 801, FIG. 8B shows a representation of the content of the audio information 802, and FIG. 8C shows the content of the link information 803.

In FIG. 8A, the area surrounded by the dotted line above the display image information 801 is a non-displayed area which is provided in each set of display image information. As its name suggests, this non-displayed area is not displayed on the screen of the display unit 154. An image of an identification number, such as "0001" shown in the drawing, is written into the top-right corner of the non-displayed area by the transmission data generating unit 112. The displayed area of display image information 801 is one display image which is composed of an image which was originally expressed as image information and character strings which have been converted from the original character code files into images.

The audio information 802 is linked to the character string "AUDIO INFORMATION" which is a hot spot in the HTML document 301. Here, the file which includes the audio information 802 is also given the identification number "0001", as shown in FIG. 8B.

The file storing the link information 803 is also given the identification number "0001", as shown in FIG. 8C. This link information 803 is used for control purposes, and is not displayed. "<INDEX=0001>" on line 811 of the link information 803 is the index information which indicates that the file identification number of the transmission data 800 is "0001".

The character string on line 812 indicates that instruction "GO_TO_PAGE(0002)" is related to a position in display image information 801 which is specified by the coordinates (100,600) and that a cursor image held by the data receiving apparatus 150 should be displayed at this position. Instruction "GO_TO_PAGE(0002)" indicates that a page having identification number "0002", which in this case corresponds to the transmission data 900, should be displayed.

The character string on line 813 indicates that the instruction "GO_TO_PAGE(0003)" is related to a position in the display image information 801 specified by the coordinates (100,700) and that a cursor image held by the data receiving apparatus 150 should be displayed at this position. This instruction "GO_TO_PAGE(0003)" indicates that a page having identification number "0003", which in this case corresponds to the transmission data 1000, should be displayed.

FIGS. 9A and 9B show the transmission data 900 which is the second page of the home page provided by the WWW server. This transmission data 900 includes the display image information 901 and the link information 902, which is related to the display image information 901. Here, FIG. 9A shows the display image which is the content of the display image information 901 and FIG. 9B shows the content of the link information 902.

As shown in FIG. 9A, an image of the identification number "0002" is written in the top-right corner of the non-displayed area of the display image information 901 which is shown by the dotted line, in the same way as with the display image information 801.

As shown in FIG. 9B, the file storing link information 902 is given the identification number "0002".

In FIG. 9B, <INDEX=0002>on line 911 is the index information, indicating that the file identification number for transmission data 900 is "0002".

The character string on line 912 indicates that the instruction "GO_TO_PAGE(0001)" is related to a position in the display image information 901 specified by coordinates (050,400) and that a cursor image held by the data receiving apparatus 150 should be displayed at this position. This instruction "GO_TO_PAGE(0001)" indicates that a page having identification number "0001," which in this case corresponds to the transmission data 800, should be displayed.

FIGS. 10A and 10B show the transmission data 1000 which is the third page of the home page provided by the WWW server. Transmission data 1000 includes display image information 1001 and link information 1002, which is related to display image information 1001. Here, FIG. 10A shows the display image which is the content of the display image information 1001 and FIG. 10B shows the content of the link information 1002.

As before, an image of the identification number "0003" is written into the top-right corner of the non-displayed area of display image information 1001.

As shown in FIG. 10B, the file storing link information 1002 is given the identification number "0003".

"<INDEX=0003>" on line 1011 of the link information 1002 is the index information, indicating that the identification number of the files of the transmission data 1000 is "0003".

The character string on line 1012 indicates that the instruction "GO_TO_PAGE(0001)" is related to a position in the display image information 901 specified by the coordinates (050,400) and that a cursor image should be displayed at this position. This instruction "GO_TO PAGE (0001)" indicates that a page having identification number "0001", which in this case corresponds to transmission data 800, should be displayed.

Illustrative Example of the Processing by the Information Obtaining Unit 111 and the Transmission Data Generating Unit 112

The following is a specific example of the processing performed by the information obtaining unit 111 and the transmission data generating unit 112 in which the files shown in FIGS. 3, 4, 5, and 6 are obtained and are used to generate the transmission data shown in FIGS. 8, 9, and 10.

Processing by the Information Obtaining Unit 111

The information obtaining unit 111 first refers to the file list storing unit 121 and issues a connection request to the indicated WWW server on the Internet. The information obtaining unit 111 then obtains the HTML document 301 "Report.html" from this WWW server, assigns it the file name "Report.html", and stores the file in the buffer. The information obtaining unit 111 also obtains the compressed image information 401, the HTML document 501, and the HTML document 601 in the same way from the WWW server.

Processing by the Transmission Data Generating Unit 112

The transmission data generating unit 112 allocates storage areas in the transmission data holding unit 113 for respectively storing the display image information 801, the audio information 802, and the link information 803 which compose the transmission data 800. In doing so, the transmission data generating unit 112 assigns the identification number "0001" for retrieving transmission data 800 to these storage areas. The transmission data generating unit 112 then fetches the (yet-unprocessed) HTML document 301 from the buffer of the information obtaining unit 111 and writes this document into the file storage area in the work area.

The transmission data generating unit 112 then generates the index information "<INDEX=0001>" shown in line 811 of the transmission data 800 for the first page of the WWW home page from the file name "Report.html" of HTML document 301, before storing the generated index information at the start of the link information storage area for link information 803 which is provided in the transmission data holding unit 113.

The transmission data generating unit 112 then reads the tag "<HTML>" from line 311 in the HTML document 301 and stores the character string "HTML" in the "<HTML>" tag in the tag storage area of the work area. It then refers to the tag table stored in the data conversion table storing unit 122 to interpret the tag, and by doing so recognizes that line 311 is the first line of the HTML document 301. After doing so, it deletes the character string "HTML" from the tag storage area.

Next, the transmission data generating unit 112 reads the tag "<H1>" on line 312 and refers to the tag table to interpret its content. On doing so, it sets the headline flag in the flag storage area in the work area. Here, the headline flag shows that the character string following the "<H1>" tag is a headline and so should be displayed using a headline font. The characters in the character string after the "<H1>" tag are then written one character at a time into the character string storage area until the "</H1>" tag appears, which in the present case results in the character string "WEATHER REPORT" being written into the character string storage area and being converted into display image information using the headline font. This generated display image information is then added to the display image information storage area set in the transmission data holding unit 113. After this, the headline flag in the work area is reset, the character string "WEATHER REPORT" is deleted from the character string storage area, and the character string "H1" is deleted from the tag storage area.

Next, the transmission data generating unit 112 reads the tag "<CENTER>" on line 313 and sets the centering flag in the work area. The centering flag shows that the character string which follows the corresponding tag is to be centered on the display. Here, there is no character string following the "<CENTER>" tag which can be centered, so that the transmission data generating unit 112 continues by reading line 314.

The transmission data generating unit 112 reads the tag '<IMG SRC="Weather.gif">' on line 314 and refers to the tag table to interpret the content of the tag. The transmission data generating unit 112 then investigates whether the file for the image information 401, which is expressed by the file name "Weather.gif", is present in the buffer of the information obtaining unit 111, and, since this is the case, reads the file. The transmission data generating unit 112 then converts the image information 401 which is stored and compressed in the read file into a bitmap image or other such format, in accordance with a GIF decompression method.

The transmission data generating unit 112 then reads the tag "</CENTER>" on line 315 and arranges the bitmap image converted from image information 401 in accordance with the centering flag set in the work area. The display image information thus generated is then added to the display image information storage area in the transmission data holding unit 113, before the centering flag in the work area is reset.

The transmission data generating unit 112 then reads the "<P>" tag on line 316 and sets the paragraph flag. The paragraph flag shows that the character strings displayed between this start tag and the "</P" end tag should be displayed as a single paragraph which is to be inserted into the following blank line. As with "WEATHER REPORT" on line 312, the character string "TOMORROW, THE WHOLE OF JAPAN WILL ENJOY SPRINGLIKE WEATHER" between these tags is read and is stored in the character string storage area in the work area. Next, after reading the "</P>" tag, the transmission data generating unit 112 converts the character string "TOMORROW, THE WHOLE OF JAPAN WILL ENJOY SPRINGLIKE WEATHER" into an image using the font for paragraph display which is stored as one of the font files and adds the generated display image information to the storage area in the transmission data holding unit 113 for display image information storage area 801. After this, the content of the work area is cleared as before.

The transmission data generating unit 112 next reads the tag "<UL>" on line 318, interprets it, and sets the itemized list flag in the work area. The itemized list flag shows that each character string which follows the tag and is interpreted as one item should be displayed as a non-numbered item in a list.

The transmission data generating unit 112 next reads the tag "<L1>" on line 319, refers to the tag table, interprets the tag as indicating the start of one item in a list, and sets the item flag in the flag storage area. The item flag shows that the display position on the display screen should be shifted to the next line every time an "<L1>" or "</L1>" tag is read.

The transmission data generating unit 112 reads the tag "<A HREF="Tokyo.html>" following the tag "<L1>" and writes it into the tag storage area. The transmission data generating unit 112 then interprets this tag "<A HREF= "Tokyo.html>" and sets the link flag in the flag storage area.

When the extension of the file name given as the attribute of the "<A>" tag indicates audio information, the link flag shows that processing for the audio information is to be performed so that the audio information is converted into a predetermined format and stored in the audio information storage area. When the extension of the file name given as the attribute of the "<A>" tag does not indicate audio information, the link flag shows that the character string between the "<A>" and "</A>" tags which is appended with the link by the "<A>" tags is to be converted into an image with a two-character space provided before it as a cursor display area. The link flag also shows that display image information is to be generated for this character string in addition to hot spot information which is generated in accordance with the format of the hot spot information 702.

The transmission data generating unit 112 reads the character string "TOKYO" between the "<A HREF= "Tokyo.html>" and "</A>" tags and writes it into the character string storage area. After reading the "</A>" tag, the transmission data generating unit 112 converts the character string "TOKYO" into an image with a two-character space provided before it as a cursor display area and arranges the character string in accordance with the itemized list flag to generate display image information which it adds to the display image information storage area provided in the transmission data holding unit 113. The transmission data generating unit 112 then calculates the coordinates of the cursor display position as (100,600), and uses these coordinates and the attribute "Tokyo.html" stored in the tag storage area of the work area to generate the hot spot information shown on line 812 of FIG. 8. After doing so, the transmission data generating unit 112 adds the generated hot spot information to the link information storage area provided in the transmission data holding unit 113. Having done so, the transmission data generating unit 112 deletes the character string "A HREF="Tokyo.html" in the tag storage area of the work area and the character string "TOKYO" in the character string storage area, in addition to resetting the link flag.

Next, on reading the "<L1>" tag on line 320, the transmission data generating unit 112 shifts the display position for the next display image to the following line in accordance with the item flag, and, in the same way as with line 319, generates display image information for the character string "OSAKA", in addition to generating the hot spot information shown on line 813 of FIG. 8C. The generated display image information is then added to the display image information storage area provided in the transmission data holding unit 113 and the generated hot spot information is added to the link information storage area. After this, the transmission data generating unit 112 deletes the character string "A HREF="Osaka.html" and the character string "OSAKA", and resets the link flag.

Next, on reading the "<L1>" tag on line 321, the transmission data generating unit 112 shifts the display position for the next display image to the following line in accordance with the item flag, and sets the link flag in accordance with the tag "A HREF="Weather.au". On investigating the file name extension of the attribute in accordance with the link flag, the transmission data generating unit 112 finds that the link destination file is audio information in AU format, so that it converts the AU format audio information into audio information of a predetermined format, before storing the converted audio information in the audio information storage area provided in the transmission data holding unit 113.

Next, on reading the "</L1>" tag on line 322, the transmission data generating unit 112 interprets that the itemized list is complete, and resets the itemized list flag and the item flag.

Finally, on reading the "</HTML>" tag on line 323, the transmission data generating unit 112 interprets that the HTML document 301 has ended, and so terminates the generation process for transmission data 800.

Following this, the transmission data generating unit 112 finds that there is an unprocessed HTML document 501 and so sets a display image information storage area for display image information 901 and a link information storage area for link information 902 in the transmission data holding unit 113 for storing the composite parts of the transmission data 900, in doing so giving both storage areas the identification number "0002" for the retrieval of the transmission data 900. It then reads the unprocessed HTML document 501 from the buffer of the information obtaining unit 111 and writes it into the work area.

The transmission data generating unit 112 then generates the index information "<INDEX=0002>" shown in line 911 of the transmission data 900 which displays the second page of the WWW home page from the file name "Tokyo.html" of the HTML document 501, before storing the generated index information at the start of the link information storage area for the link information 902 which is provided in the transmission data holding unit 113. In the same way as with the generation of the transmission data 800 from the HTML document 301 and the image information 401, the transmission data generating unit 112 then generates the transmission data 900 from the HTML document 501 and the transmission data 1000 from the HTML document 601, with no further explanation of this process being given.

Construction of the Transmission Data Holding Unit 113, the Transmission Data Reading Unit 114, the Multiplexing Unit 115, and the Transmitting Unit 116

The transmission data holding unit 113 includes a display image information storing unit 123, an audio information storing unit 124, and a link information storing unit 125, with simultaneous retrieval from these units being possible.

The display image information storing unit 123 can be realized by RAM (Random Access Memory) or a hard disk device, and is provided with a plurality of display image information storage areas which are set by the transmission data generating unit 112. Each of these display image information storage areas stores one file of display image information which is generated by the transmission data generating unit 112.

The audio information storing unit 124 can also be realized by RAM (Random Access Memory) or a hard disk device, and is provided with a plurality of audio information storage areas which are set by the transmission data generating unit 112. Each of these audio information storage areas stores one file of audio information which is generated by the transmission data generating unit 112.

The link information storing unit 125 can also be realized by RAM (Random Access Memory) or a hard disk device, and is provided with a plurality of link information storage areas which are set by the transmission data generating unit 112. Each of these link information storage areas stores one file of link information which is generated by the transmission data generating unit 112.

The transmission data reading unit 114 simultaneously reads the display image information, the audio information, and the link information in a same transmission data file from the storage areas provided in the transmission data holding unit 113 in the order of the file identification numbers for the transmission data, and outputs the read information to the multiplexing unit 115. After reading the files for the transmission data which has the final identification number, the transmission data reading unit 114 returns to the transmission data with the identification number 0001" and once again reads the transmission data in the order of the identification numbers. This is to say, the transmission data reading unit 114 cyclically reads the transmission data from the transmission data holding unit 113 in order of identification numbers and outputs the transmission data to the multiplexing unit 115. In doing so, there is the following difference in the reading method when audio information is or is not present. When no audio information is present, the transmission data reading unit 114 advances to the reading of a set of transmission data with the next identification number after reading a first set of transmission data once. When audio information is present, the transmission data reading unit 114 reads the audio information and advances to the reading of a set of transmission data with the next identification number only after reading the display image information and the link information a plurality of times for the period which is required by the reproduction of the audio information. As one example, if the audio information has a reproduction period of two seconds, the transmission data reading unit 114 will read the audio information once, and will read the display image information and link information 60 times (30 frames per second*2 seconds), before advancing to the reading of a set transmission data with the next identification number. In this way, the transmission time for audio information can be maintained.

The multiplexing unit 115 multiplexes the display image information (including the audio information) and the link information read by the transmission data reading unit 114, and outputs multiplexed data to the transmitting unit 116. Here, this multiplexing can be performed using the same method as conventional teletext broadcasting. In such a case, display image information and audio information are multiplexed in the same way as the images and audio included in conventional TV broadcasts, while link information is multiplexed in the same way as the text information multiplexed with teletext broadcasts. This is to say, when no audio information is present, the display image information is transmitted in the image section of one frame of the television image signal, while the link information is transmitted in the retrace section of the same one frame of the television image signal. When audio information is present, the audio information is transmitted as the television audio signal, while the corresponding display image information and link information are transmitted in the image area and retrace area, respectively, of the television image signal for the number of frames required by the reproduction of the audio information.

The transmitting unit 116 successively transmits the transmission data which has been multiplexed by the multiplexing unit 115 on a TV broadcast ground wave.

Transmission Method for the Transmission Data

Figure 11A:
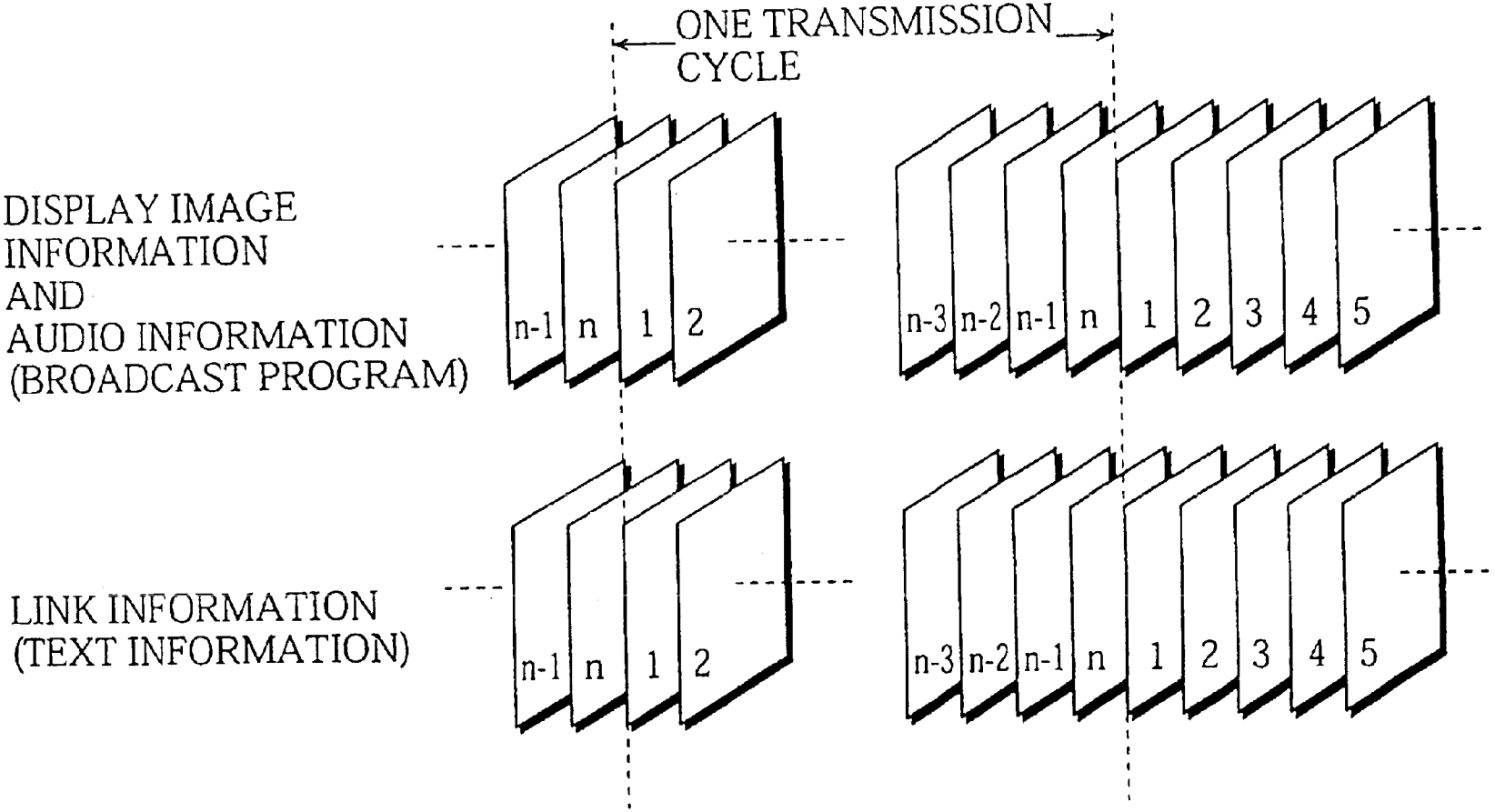
FIG. 11A gives a graphic representation of the transmission method used by the transmitting unit in the first embodiment.

FIG. 11A gives a graphic representation of the transmission method used by the transmitting unit 116. FIG. 11A shows the case when n pages (n being a positive integer) of transmission data are generated by the transmission data generating unit 112. In FIG. 11A, a pairing of audio information and display image information with a same identification number is expressed as one transmission unit corresponding to a normal TV broadcast, and the link information for the same identification number is expressed as one transmission unit corresponding to the text information which is multiplexed into a standard teletext broadcast.

As shown in FIG. 11A, in addition to being identified by the same identification number, the display image information, audio information, and link information stored in one transmission data file are transmitted at a corresponding time. Also, the transmission data from the first to the nth page in the transmission data holding unit 113 are cyclically transmitted in the order of identification numbers.

It should be noted here that while the transmission data reading unit 114 has been described as reading the display image information, the audio information, and the link information stored in the same transmission data file simultaneously from the display image information storing unit 123, the audio information storing unit 124, and the link information storing unit 125 and as having the read display image information, audio information, and link information transmitted with related identification numbers and transmission timing, the display image information and the link information do not need to be transmitted with a related timing. As one example, the transmission data reading unit 114 may instead be composed of a first reading unit and a second reading unit. Here, the first reading unit is constructed to continuously read pairs of display image information from the display image information storing unit 123 and audio information from the audio information storing unit 124 which it then outputs to the multiplexing unit 115. The second reading unit is constructed to continuously read only the link information from the link information storing unit 125 which it then outputs to the multiplexing unit 115. By doing so, the display image information and link information belonging to a same transmission data file do not need to be transmitted by the transmitting unit 116 at the same time, since the data receiving apparatus 150 can use the identification number commonly given to the display image information and the link information to recombine pairs of the display image information and the link information.

The multiplexing unit 115 has also been described as multiplexing the display image information (including the audio information) and the link information which are generated by the transmission data generating unit 112, with the transmitting unit 116 transmitting the transmission data which has been multiplexed by the multiplexing unit 115 on a TV broadcast ground wave, although the display image information and link information do not need to be multiplexed together for transmission. As one example, the display image information and the audio information may be transmitted on a TV broadcast ground wave or as a digital satellite broadcast, while the link information may be transmitted using a telephone link and modem, or the like. Transmission here may alternatively be performed using multiple channels.

When digital satellite broadcasting is used as the data transmission method, compression/encryption and multiplexing may be performed according to MPEG2 (Moving Pictures Experts Group) video standard and system standard, so that display image information may be set as I pictures, with the audio information and link information being set as private information. Here, when it is possible for the display image information, audio information, and link information to be transmitted as digital data, it is no longer necessary to write a graphic representation of the identification number into the non-displayed area of the display image information, so that the identification number can be simply appended to the display image information and audio information, in the same way as with the link information. Incidentally, a detailed description of MPEG2 standard is given in "Saishin MPEG Kyoukasho [Latest MPEG Reader[" published by ASCII Publishing, Inc.

Figure 11B:
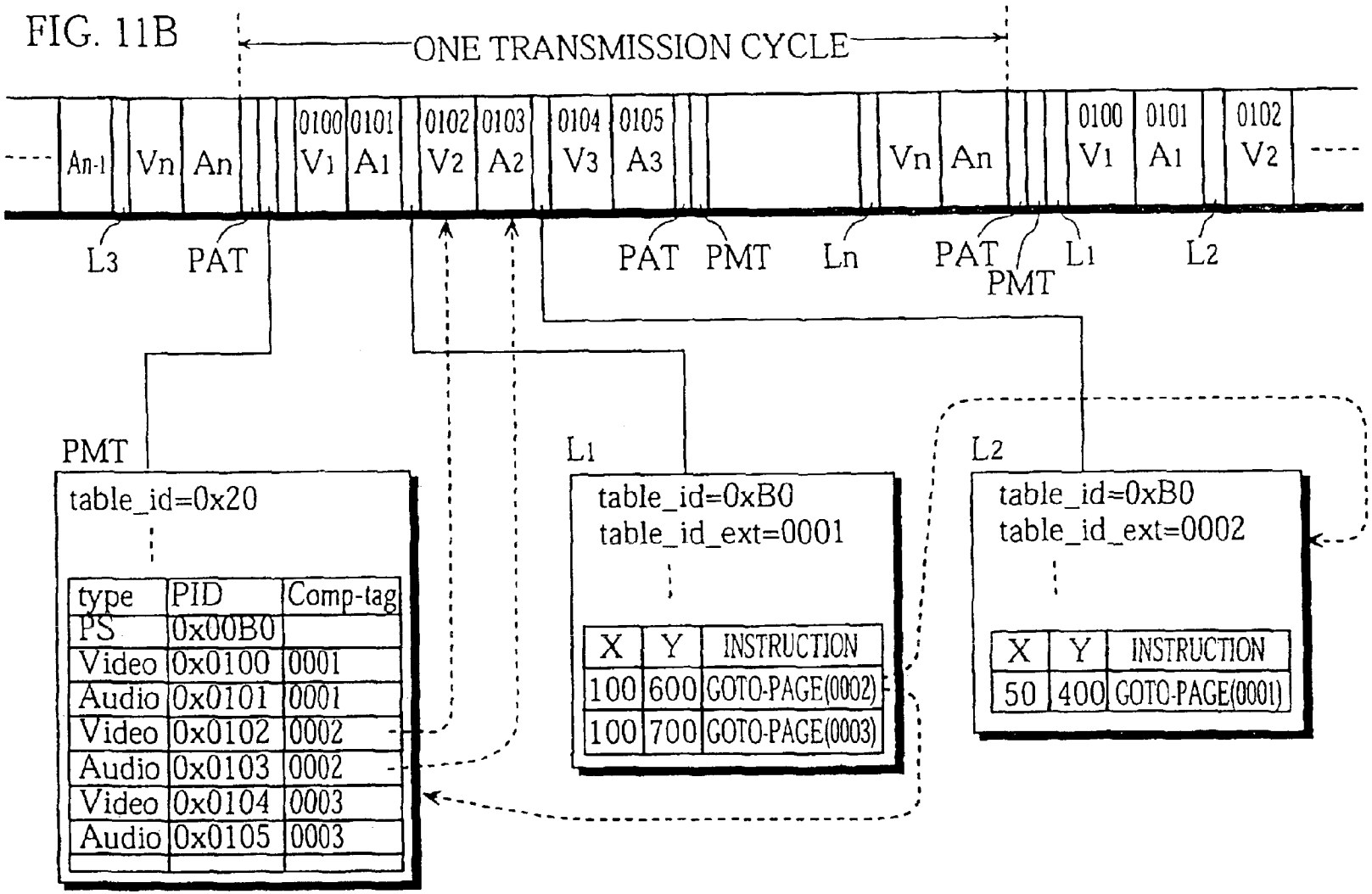
FIG. 11B shows the multiplexed stream which is transmitted when digital satellite broadcasting is used in the first embodiment.

FIG. 11B shows the multiplexed stream which is transmitted when digital satellite broadcasting is used. The upper part of this drawing shows a transport stream under MPEG2 standard which has been generated by the multiplexing unit 115.

The symbols "V1, A1, L1" in the transport stream represent the display image information, audio information, and link information which have the identification number "0001" and which are read from the transmission data file and multiplexed together. This is also the case for "V2, A2, L2". . . "Vn, An, Ln".

"V1" is a video elementary stream which shows the display image information which has been converted into I (Intra) pictures under MPEG2 standard, with the PID (Packet IDentifier) "0×0100" having been attached to identify the stream. This is also the case for "V2" . . . "Vn".

"A1" is an audio elementary stream which shows the audio information which has been converted under MPEG2 standard, with the PID "0×0101" having been attached to identify the stream. This is also the case for "A2" . . . "An".

"L1–Ln" are private sections according to MPEG2 standard for attaching each set of link information, with the PID "0×B0" having been attached to identify these as private sections. Here, identification numbers are also set in the table ID extensions to identify separate sets of link information. Each of these sets of link information is set with at least one pairing of one part of the image area of the corresponding display image and information showing a link to another display image. As one example, in "L1", the display area centered on the coordinates (X,Y)=(100,600) is set with the link "GOTO_PAGE(0002)" representing a link to the display image with the identification number "0002", while the display area centered on the coordinates (X,Y)=(100,700) is set with the link "GOTO_PAGE(0003)" representing a link to the display image with the identification number "0003".

The correspondence between the PIDs described above and the identification numbers is set according to the PMT (Program Map Table) under MPEG2 standard. Here, the correspondence between the PIDs and the identification numbers can be written in the descriptors of the private sections, such as by setting the identification numbers as the component tags in the PMT, as shown in FIG. 11B.

In the above case, the video elementary stream, audio elementary stream, and private sections are generated by the transmission data generating unit 112 and are stored in the transmission data holding unit 113. Here, a set of one video elementary stream, one audio elementary stream, and one private section stored in the transmission data holding unit 113 corresponds to one transmission data file. Here, the video elementary stream, audio elementary stream, and private section stored as one set in the transmission data holding unit 113 are each read once, with the transmission data reading unit 114 cyclically reading all of the transmission data files. Using this data, transport streams are generated by the multiplexing unit 115.

As described above, by multiplexing n sets of display image information, audio information, and link information with a PMT in the transport stream, transmission data can be easily transmitted using digital satellite broadcasting.

Overview of the Procedure of the

Data Transmitting Apparatus 110

Figure 12:
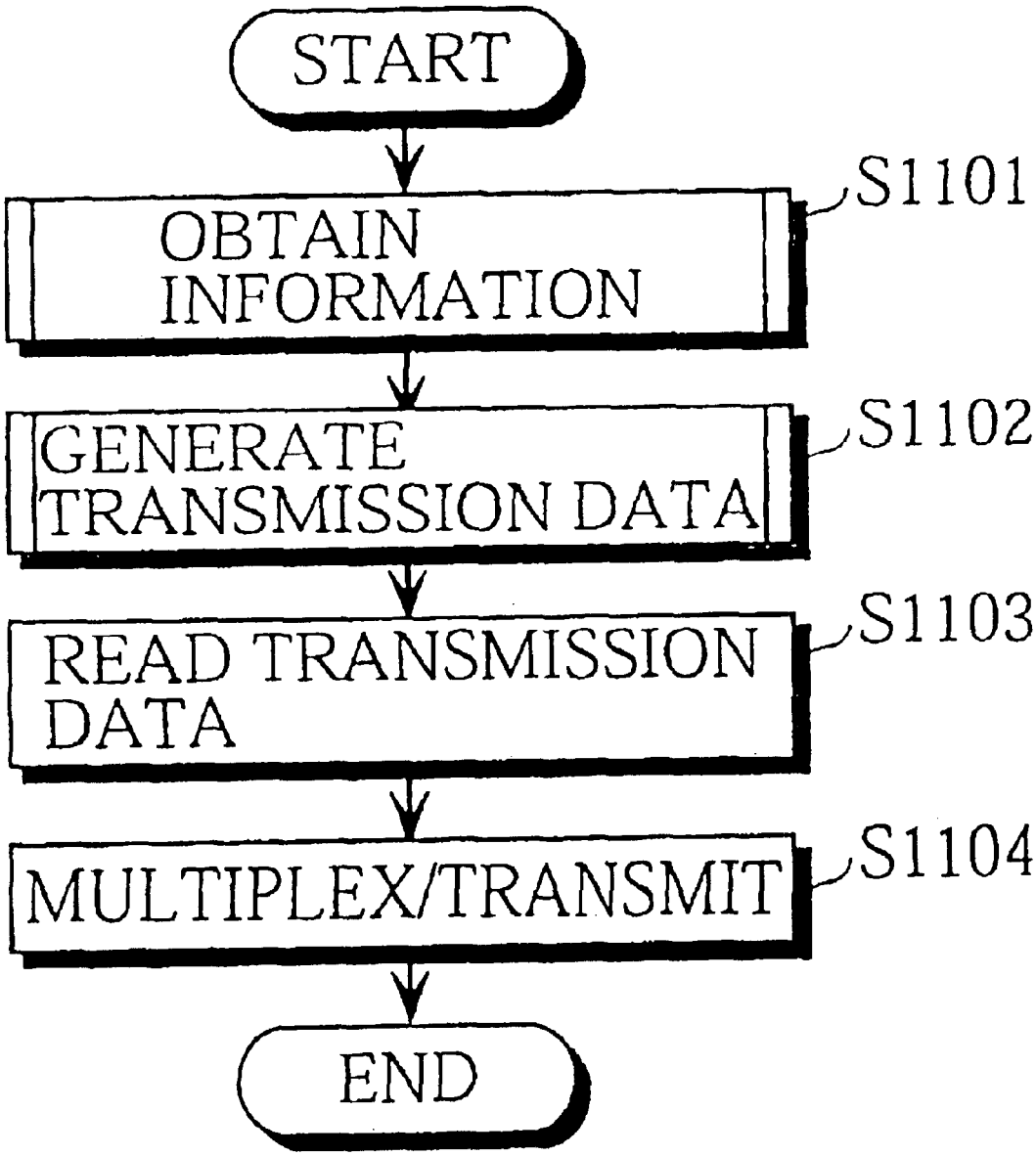
FIG. 12 is a flowchart showing an overview of the procedure of the data transmitting apparatus in the first embodiment.
Figure 13:
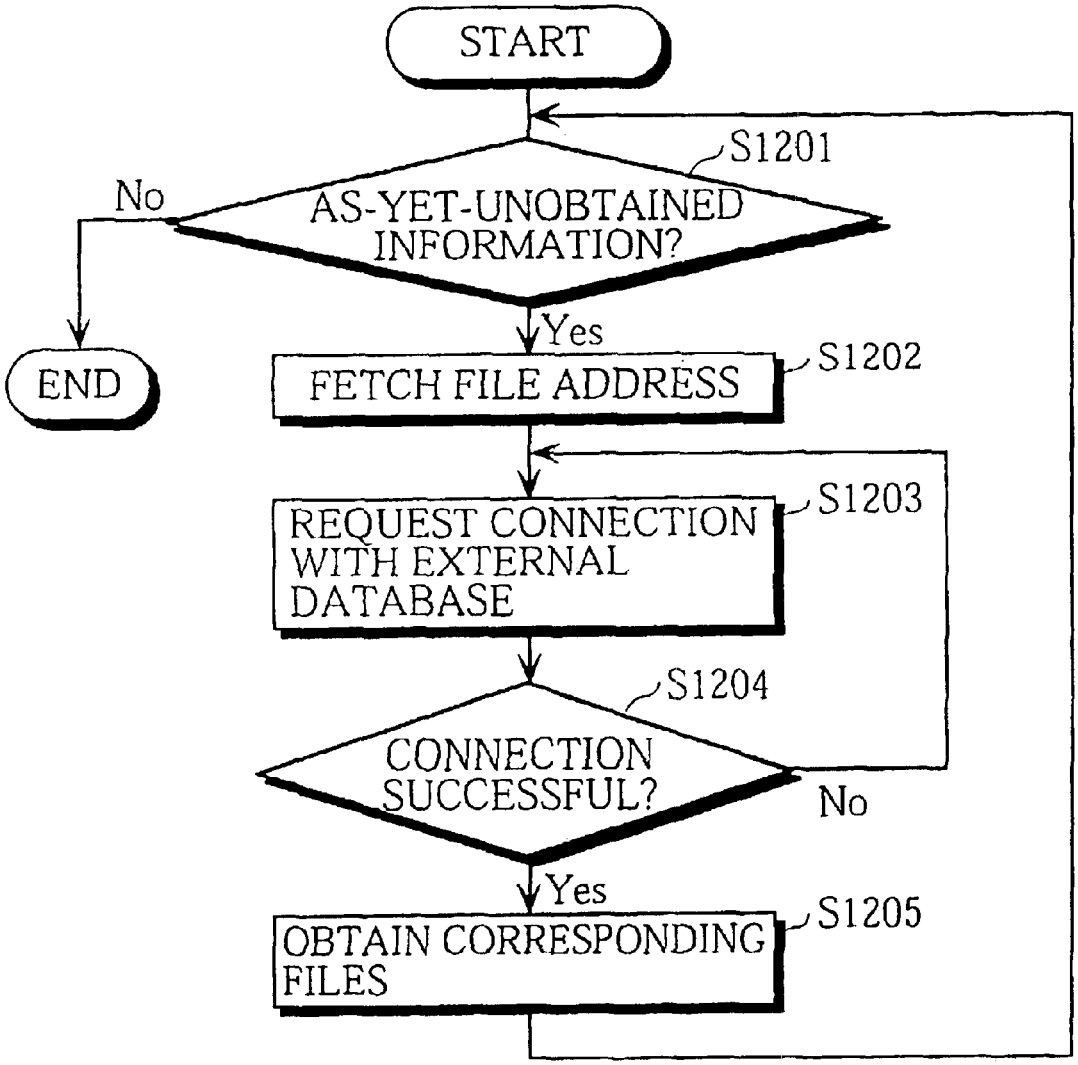
FIG. 13 is a flowchart showing an example information obtained procedure of the information obtaining unit in the first embodiment.
Figure 14:
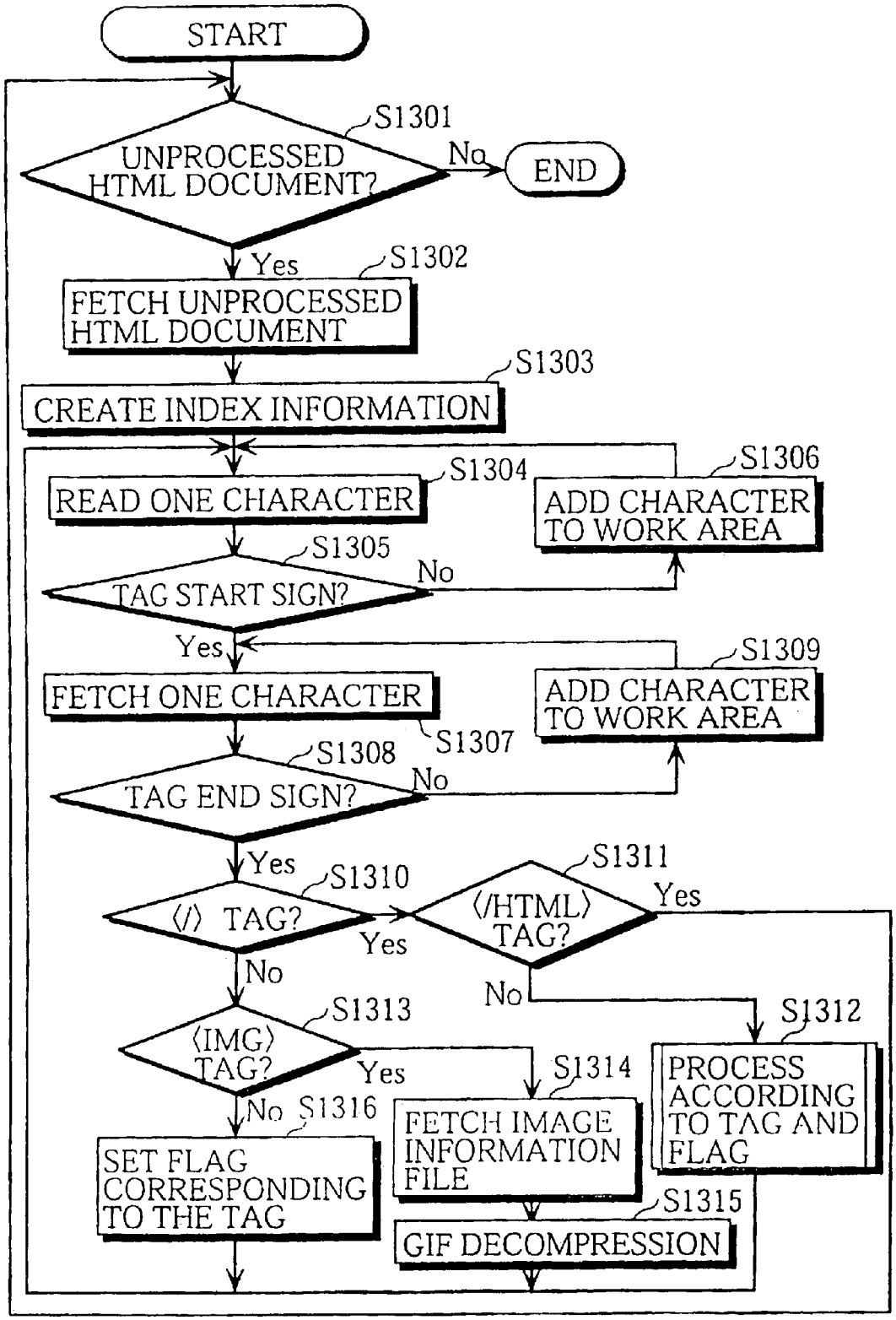
FIG. 14 is a flowchart showing an example procedure for generating transmission data by the transmission data generating unit in the first embodiment.

The following is a detailed explanation of the procedure of the data transmitting apparatus 110, with reference to FIGS. 12 to 14.

FIG. 12 is a flowchart showing an overview of the procedure of the data transmitting apparatus 110.

The information obtaining unit 111 obtains a desired set of information from an external database and stores it in its internal buffer (step S1101).

The transmission data generating unit 112 interprets the information obtained by the information obtaining unit 111 and generates display image information, audio information, and link information, which it stores in the transmission data holding unit 113 (step S1102).

The transmission data reading unit 114 successively reads the transmission data from the transmission data holding unit 113 in order of identification numbers (step S1103)

The multiplexing unit 115 multiplexes the display image information (including the audio information) with the link information, and the transmitting unit 116 transmits the multiplexed transmission data using a television broadcast ground wave.

Procedure of the Information Obtaining Unit 111

FIG. 13 is a flowchart showing an example information obtaining procedure of the information obtaining unit The information obtaining unit 111 first refers to the file list in the file list storing unit 121 and checks whether there is any as-yet-unobtained information (step S1201). If there is not, the information obtaining procedure is terminated. If there is, the file addresses (or URLs) of the as-yet-unobtained sets of information are fetched one at a time (step S1202).

The information obtaining unit 111 then requests a connection with an external database, based on the fetched address (step S1203), and checks whether the connection has been successively established (step S1204). If the connection is unsuccessful, the processing returns to step S1203 (step S1204).

If the connection has been successful, the information obtaining unit 111 reads the file names of the as-yet-unobtained information from the file list, obtains the corresponding files from the external database, and stores them in the internal buffer (step S1205). The processing then returns to step S1201.

Procedure of the Transmission Data Generating Unit 112

FIG. 14 is a flowchart showing an example procedure for generating transmission data by the transmission data generating unit 112.

The transmission data generating unit 112 first refers to the buffer in the information obtaining unit 111 and checks whether any unprocessed HTML documents exist (step S1301). If no such documents exist, the display image generating procedure is terminated. If there is such a document, the transmission data generating unit 112 establishes the transmission data storage areas in the transmission data holding unit 113, assigns an identification number to each transmission data storage area, and then fetches an unprocessed HTML document from the buffer (step S1302).

The transmission data generating unit 112 creates index information indicative of the file name of the transmission data from the file name of the fetched HTML document, and adds the index information to the link information storage area established in the transmission data holding unit 113 (step S1303).

One character is read from the fetched HTML document and is written into the character string storage area (step S1304).

The transmission data generating unit 112 then checks whether the read character is a tag start sign "<" (step S1305). If so, the processing advances to step S1307, or if not, the character is added to the character string storage area in the work area, and the processing returns to step S1304 (step S1306).

The next character is read (step S1307), and the transmission data generating unit 112 judges whether the read character is a tag end sign ">" (step S1308). If so, the processing advances to step S1310, or if not, the read character is added to the tag storage area in the working area, before the processing returns to step S1307 (step S1309)

The character string in the tag storage area is compared with the tag table, and a check is performed to see whether it starts with a "/" sign (step S1310). If it does, the transmission data generating unit 112 judges whether the read tag is a "</HTML>" tag (step S1311). If so, the transmission data generating unit 112 resets the work area, and the processing returns to step S1310. If the read tag is not "</HTML>", the transmission data generating unit 112 operates in accordance with the least significant of the flags set in the flag storage area corresponding to this read tag, and resets the corresponding storage area in the work area (step S1312), before the processing returns to step S1304.

In step S1310, when the character string does not start with "/", a check is performed to see whether the read tag is "<IMG>" (step S1313). If so, the transmission data generating unit 112 fetches the image information file specified by the attribute of the "<IMG>" tag from the buffer in the information obtaining unit 111 (step S1314). The fetched image information is converted in accordance with a GIF decompression method into image information expressed as bitmap data (step S1315), and the processing returns to step S1304.

If the read tag is not "<IMG>", the character string in the tag storage area is compared with the content of the tag table and a flag corresponding to the tag is set in the flag storage area. The transmission data generating unit 112 then operates in accordance with this tag (step S1316), before the processing returns to step S1304.

A variety of tags can be employed in the HTML documents, and the processes represented by these tags can be performed in the same way as a conventional browser. Accordingly, the following explanation focuses on an example of the processing in step S1312 for the tag "</A>" which relates to the link information which generated in a special format for this data communication system 100.

Figure 15:
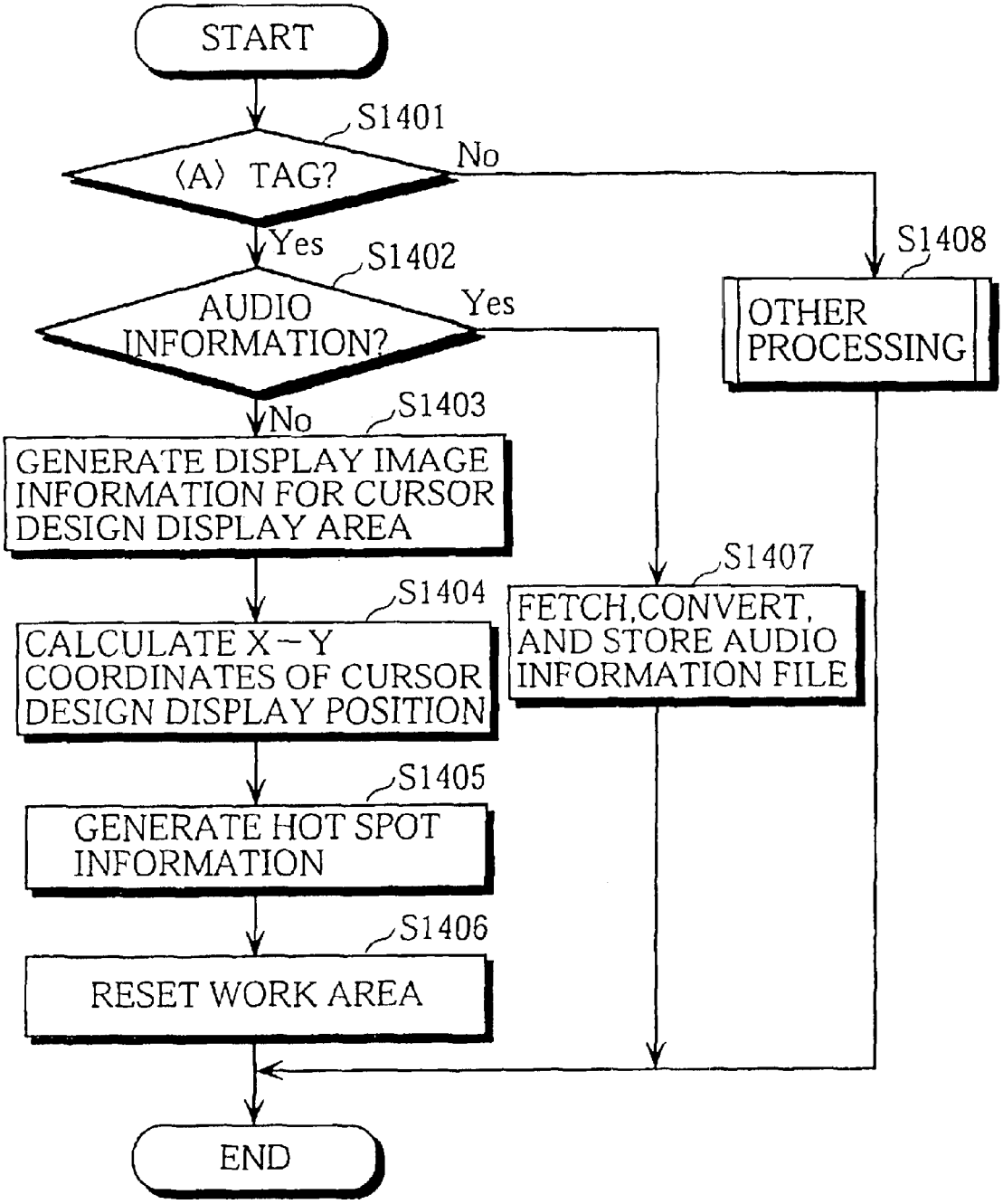
FIG. 15 is a flowchart showing a detailed example of the processing in step S1312 of FIG. 14.

FIG. 15 is a flowchart showing a detailed example of the processing in step S1312 of FIG. 14.

The transmission data generating unit 112 first checks whether the read tag is "<A>" (step S1401), and if not, the processing advances to step S1408.

If the read tag is "<A>", the transmission data generating unit 112 judges whether the link destination file specified by the attribute is an audio information file (step S1402). If it is, the processing advances to step S1407, or if not, the transmission data generating unit 112 generates display image information for the character string established in the character string storage area, in doing so leaving a display area for displaying a cursor design, before adding the generated display image information to the display image information storage area provided in the transmission data holding unit 113 (step S1403).

The transmission data generating unit 112 then calculates the X-Y coordinates which express the display position of the cursor design (step S1404).

The transmission data generating unit 112 then generates hot spot information based on the calculated X-Y coordinates and the attribute established in the tag storage area, and adds it to the link information storage area provided in the transmission data holding unit 113 (step S1405).

The transmission data generating unit 112 then resets the link flag in the work area, and deletes the character string in the tag storage area and the character-sequence storage area (step S1406).

The transmission data generating unit 112 fetches an audio information file and converts the audio information contained in the file into information of a predetermined format which it stores in the audio information storage area (step S1407).

The transmission data generating unit 112 operates in accordance with the read tag (step S1408).

Structure of the Data Receiving Apparatus 150

The following is an explanation of the components of the data receiving apparatus 150, with reference to FIGS. 16 to 20.

Structure of the Separating Unit 151

The separating unit 151 includes a read buffer 161 for reading the identification number allotted to transmission data. The read buffer 161 has storage areas for temporarily holding the display image information (including audio information) included in one transmission file and the link information included in one transmission file.

The separating unit 151 separates display image information (including audio information) and link information from the received transmission data, and stores the separated display image information and link information in the corresponding storage areas of the read buffer 161. The identification number assigned to the display image information stored in the storage area is read by recognizing the image written in the predetermined part of the non-displayed area of the display image information. The identification number assigned to the link information is read in the same manner as when reading an identification number assigned to a conventional digital data file. If the read identification number is the identification number designated by the control unit 155, the display image information (including audio information) or the link information held by the read buffer 161 is stored in the corresponding storage area in the received data holding unit 152. At this point, any audio information which is present is stored by the separating unit 151 in a corresponding storage area provided in the received data holding unit 152 at the same time as the display image information is stored, so that the audio information is gradually accumulated while the display image information with the identification number designated by the control unit 155 is repetitively transmitted. By doing so, audio information which is transmitted across a plurality of frames can be separated from the transmission data.

If the read identification number is not the identification number designated by the control unit 155, the display image information (including audio information) or its link information held by the read buffer 161 is discarded. The reading of new display image information (including audio information) and link information is continued, and the above procedure is repeated until the identification number designated by the control unit 155 is detected.

Structures of the Received Data Holding Unit 152, the Reproducing Unit 153, and the Display Unit The received data holding unit 152 stores display image information (including audio information) and link information separated by the separating unit 151 linked with their assigned identification number. The storage area for storing the display image information can be achieved by RAM or a hard disk device capable of storing one static image which is the size of the display screen.

The reproducing unit 153 reproduces the display image information stored in the received image holding unit 152 along with the graphics image (described later) inputted from the control unit 155, in accordance with an indication which it receives from the control unit 155. The reproducing unit 153 outputs the reproduced image to the display unit 154. The reproducing unit 153 also reproduces the stored audio information in synchronization with the reproduction display image information and outputs the reproduced audio to the audio output unit 157.

The display unit 154 can be realized by a television monitor which displays images according to NTSC (National Television System Committee) standard, and is used to display the display image and cursor design on its screen, in accordance with the input from the reproducing unit 153.

Structure of the Control Unit 155

The control unit 155 sets an initial value in the register storing a variable (described later), and instructs the separating unit 151 to fetch the display image information (including audio information) and link information of a page specified by this initial value, which as one example can be the identification number "0001".

The control unit 155 instructs the reproducing unit 153 to reproduce the display image information (including audio information), every time new display image information (including audio information) is stored in the received data holding unit 152. Every time new link information is stored in the received data holding unit 152, the control unit 155 interprets the link information and generates a cursor design correspondence table in which cursor designs (described later) are generated for each cursor display position. These cursor designs are expressed by cursor information which is held inside the control unit 155. The control unit 155 outputs design information expressing a cursor design together with the cursor position to the reproducing unit 153, as well as indicating the reproduction of the cursor design.

FIG. 16 shows an example of the cursor design correspondence table which the control unit 155 generates to control the display position of the cursor design.

The cursor design correspondence table shows the correspondence between each cursor display position which is expressed in the hot spot information in the link information stored in the received data holding unit 152 and the cursor number for the cursor design to be displayed at each cursor display position. The control unit 155 assigns cursor numbers to each cursor display position in the link information in order of lowest Y coordinate and then lowest X coordinate, as one example, and writes each display position into the item with corresponding cursor number in the cursor design correspondence table.

FIG. 17 shows an example of the design information stored by the control unit 155. As shown in FIG. 17, the control unit 155 stores cursor information which expresses a cursor design for each cursor number when the number is selected (referred to as the "selection state") and a cursor design for each number when the number is not selected (referred to as the "non-selection state").

On receiving an interrupt from the signal receiving unit 156, the control unit 155 interprets the type of input signal stored in the signal receiving unit 156, selects the design information of the corresponding cursor design, and outputs the cursor information to the reproducing unit 153. Following this, the control unit 155 controls the handling of the received data by the separating unit 151, in accordance with the cursor whose selection has been confirmed.

Display Control Procedure for the Received Data

The following is a detailed explanation of the display control procedure by the control unit 155 for a set of received data, a set of received data referring to display image information (including audio information) and link information which have been stored in corresponding storage areas in the received data holding unit 152 by the separating unit 151 and which have the same identification number.

The control unit 155 sets a predetermined value, such as "1", into the variable "P-Index" which expresses the identification number of the received data to be displayed. The control unit 155 then sets a predetermined value, such as "1", into the variable "Cur-Pos" showing the cursor number which is in the selection state. Following this, the control unit 155 instructs the separating unit 151 to obtain the transmission data indicated by the variable "P-Index". The control unit 155 then interprets the link information in the received data which is received in accordance with this instruction and is stored in the received data holding unit 152, and outputs the cursor information for each cursor, the cursor indicated by the variable Cur-Pos being in the selection state, together with the display position to the reproducing unit 153. Here, when an interrupt from the signal receiving unit 156 occurs, the control unit 155 interprets the control signal stored in the signal receiving unit 156. First, the control unit 155 checks whether the input signal was "Up", in which case the control unit 155 decreases the value of variable Cur-Pos by 1. If not, the control unit 155 checks whether the input signal was "Down", in which case the control unit 155 increases the value of variable Cur-Pos by 1. If not, the control unit 155 checks whether the input signal was "Enter", in which case the control unit 155 finds the coordinates of the display position from the cursor number given by the variable Cur-Pos, and obtains the identification number of the file which is the link destination file written in the hot spot information for these coordinates. The control unit 155 then sets this identification number in the variable P-Index, and instructs the separating unit 151 to obtain the transmission data shown by the variable P-Index.

Structure of the Signal Receiving Unit 156 and the Audio Output Unit 157

On receiving an input signal from a remote controller (not-illustrated) or the like, the signal receiving unit 156 creates an interrupt for the control unit 155 in accordance with the received input signal, as well as holding the received input signal.

The audio output unit 157 can be realized by a speaker or the like, and is used to output the reproduced audio information as audio.

Example of a Display Image

Figure 18:
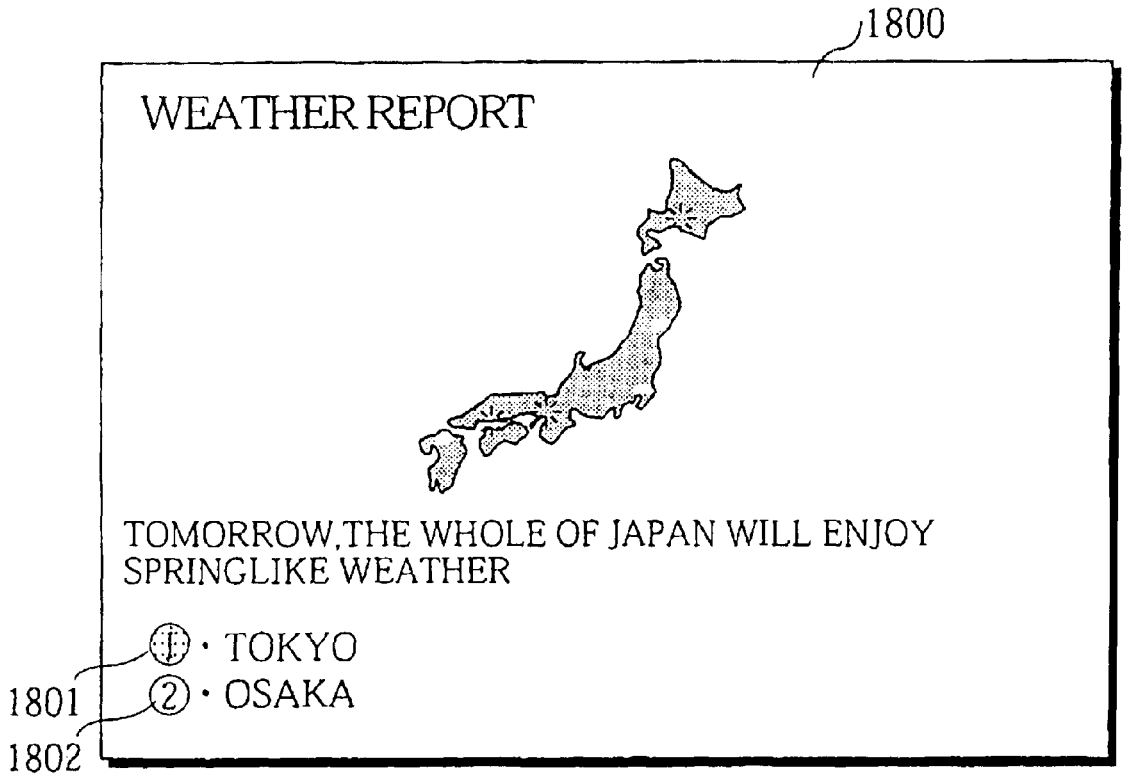
FIG. 18 shows the display image for the initial screen which is displayed by the display unit based on the transmission data shown in FIGS. 8A to 8C.

FIG. 18 shows display image 1800 for the initial screen which is displayed by the display unit 154 based on the transmission data 800 shown in FIGS. 8A to 8C.

As shown in FIG. 18, the display image 1800 has the cursor design 1801 corresponding to cursor number "1" displayed at a display position (100,600) indicated by the display image information 801, in accordance with the hot spot information given on line 812 of the link information 803. It should be noted here that the cursor information which represents the selection state has been selected for cursor design 1801 in accordance with the initial value of the variable Cur-Pos which is held by the control unit 155.

In the same way, the cursor design 1801 corresponding to cursor number "2" is displayed at a display position (100, 700), in accordance with the hot spot information given on line 813 of the link information 803. It should be noted here that the cursor information which represents the non-selection state has been selected from cursor design 1802 since its cursor number "2" does not coincide with the initial value of the variable Cur-Pos.

Here, since the transmission data 800 includes audio information 802 in addition to the display image information 801, an audio commentary is outputted by the audio output unit 157 when the display image 1800 is displayed on the display unit 154.

Figure 19:
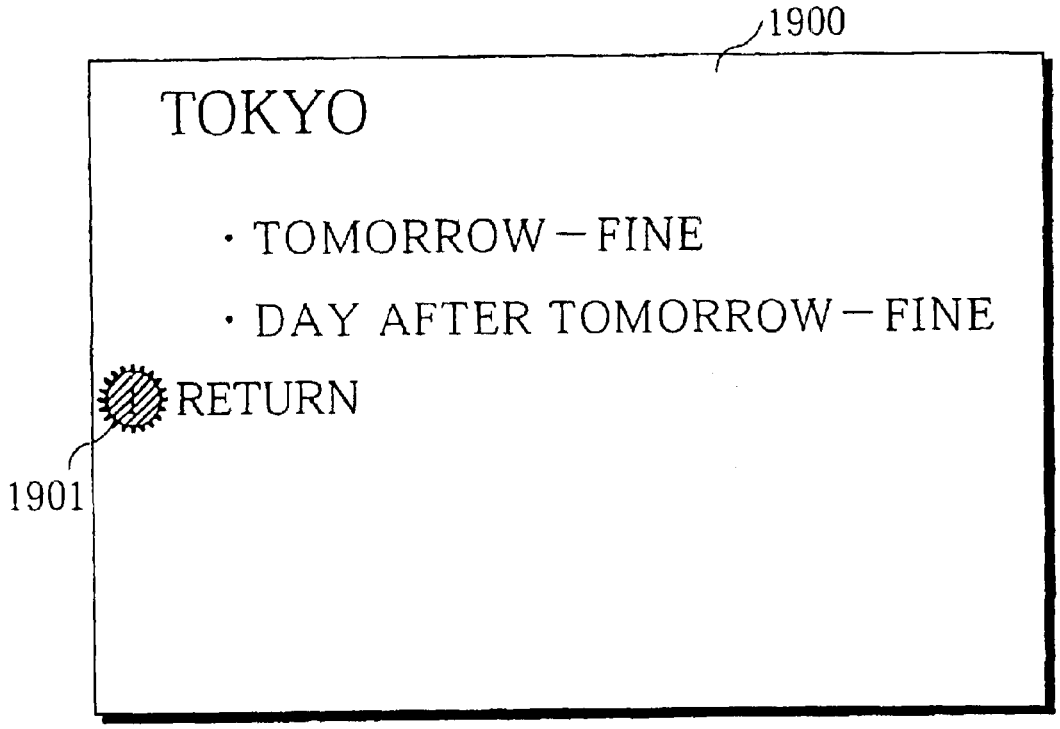
FIG. 19 shows the display image which is the initial screen displayed by the display unit for the transmission data shown in FIGS. 9A and 9B.

FIG. 19 shows the display image 1900 which is the initial screen displayed by the display unit 154 for the transmission data 900 shown in FIGS. 9A and 9B.

As with the display image 1800 in FIG. 18, the display image 1900 has the cursor design 1901 displayed at a display position (050,400) indicated by the display image information 901, in accordance with the hot spot information given on line 912 of the link information 902. Here, the cursor information for the selection state is selected as cursor design 1901.

Figure 20:
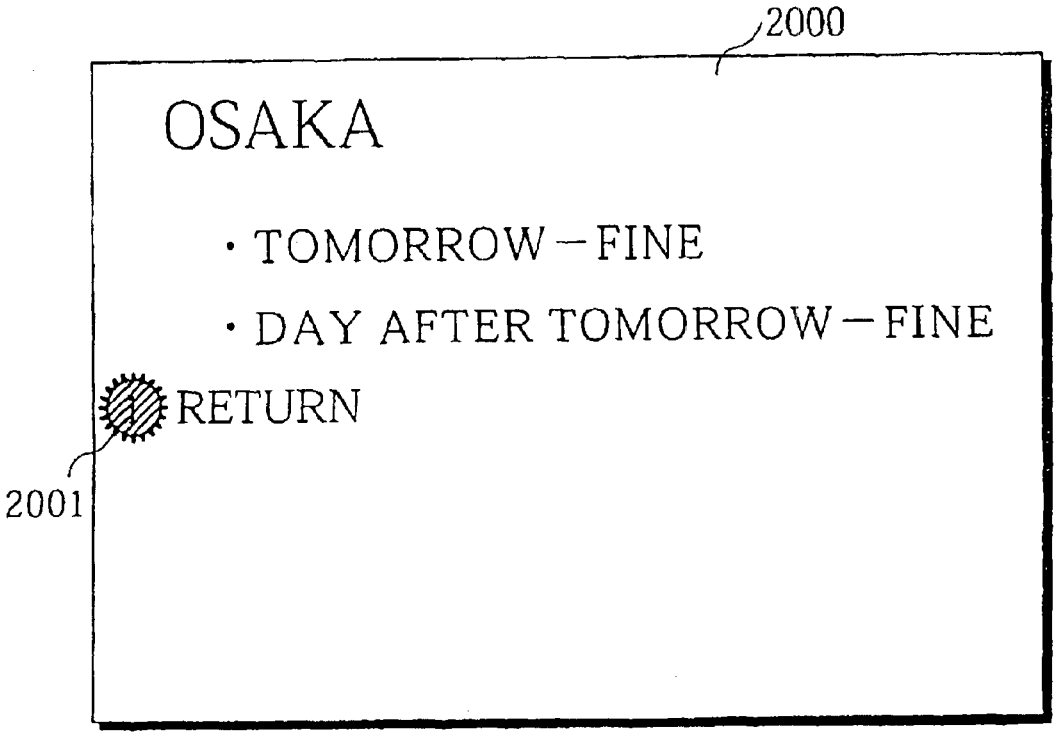
FIG. 20 shows the display image which is the initial screen displayed by the display unit for the transmission data shown in FIGS. 10A and 10B.

FIG. 20 shows the display image 2000 which is the initial screen displayed by the display unit 154 for the transmission data 1000 shown in FIGS. 10A and 10B.

As before, the display image 2000 has the cursor design 2001, which corresponds to cursor number "1" and which shows the selection state, displayed at a display position (050,400) indicated by the display image information 1001, in accordance with the hot spot information given on line 1012 of the link information 1002.

Specific Example of the Procedure of the Control Unit 155

The following is an explanation of a specific example of the procedure executed by the control unit 155 when displaying the display image 1800 on the display unit 154 based on the transmission data 800.

The control unit 155 first sets the initial value of the variable P-Index at "0001" and the initial value of the variable Cur-Pos at "1". Next, the control unit 155 instructs the separating unit 151 to obtain the display image information 801 (including the audio information 802) and the link information 803 which have the identification number "0001" set in the variable P-Index. The control unit 155 then instructs the reproducing unit 153 to reproduce the display image information 801 (including audio information 802) stored in the received data holding unit 152. The reproducing unit 153 reproduces the display image information 801 and outputs it to the display unit 154 and simultaneously reproduces the audio information 802 which it outputs to the audio output unit 157. The control unit 155 interprets the link information 803 stored in the received data holding unit 152, generates a cursor design correspondence table, and outputs design information for each cursor and their display positions to the reproducing unit 153. At this point, the cursor indicated by the variable Cur-Pos, which is to say the first cursor, is displayed in the selection state.

The control unit 155 then waits for an input from the signal receiving unit 156. Here, suppose that a "Down" signal is inputted into the signal receiving unit 156 from an external remote controller. When the input signal is "Down", the control unit 155 increases the value of variable Cur-Pos by "1", making it "2". Next, the cursor information for the selection state is selected as the design for cursor number "2" which is indicated by this updated variable Cur-Pos, and the cursor information for the non-selection state is selected as the design for cursor number "1" which was formerly indicated by the variable Cur-Pos, with these sets of cursor information being outputted to the reproducing unit 153.

The control unit 155 waits for an interrupt from the signal receiving unit 156, with the following explanation describing the case when the signal receiving unit 156 stores an input signal for a pressing of the "Enter" key after generating the interrupt. If the input signal is "Enter", the control unit 155 reads the X-Y coordinates (100,700) corresponding to cursor number "2" which is indicated by the variable. Cur-Pos from the cursor design correspondence table. Next, the control unit 155 reads the identification number of the link destination file of the hot spot information on line 813, based on these X-Y coordinates (100,700), and obtains the identification number "0003". Next, this identification number "0003" is set as the value of the variable P-Index. Following this, the control unit 155 instructs the separating unit 151 to obtain the display image information 1001 and the link information 1002 which have the identification number indicated by this variable P-Index. The control unit 155 then resets the variable Cur-Pos to "1".

By repeating the processing described above, the display image 2000 shown in FIG. 20 can be displayed on the display unit 154. Here, if an interrupt occurs when the value of the variable Cur-Pos is "1", and an input signal for "Enter" is being stored by the signal receiving unit 156 when the control unit 155 refers to the signal receiving unit 156, the control unit 155 will have the display image 1900 shown in FIG. 19 displayed on the display unit 154, as described above.

Procedure for Display Control

Figure 21:
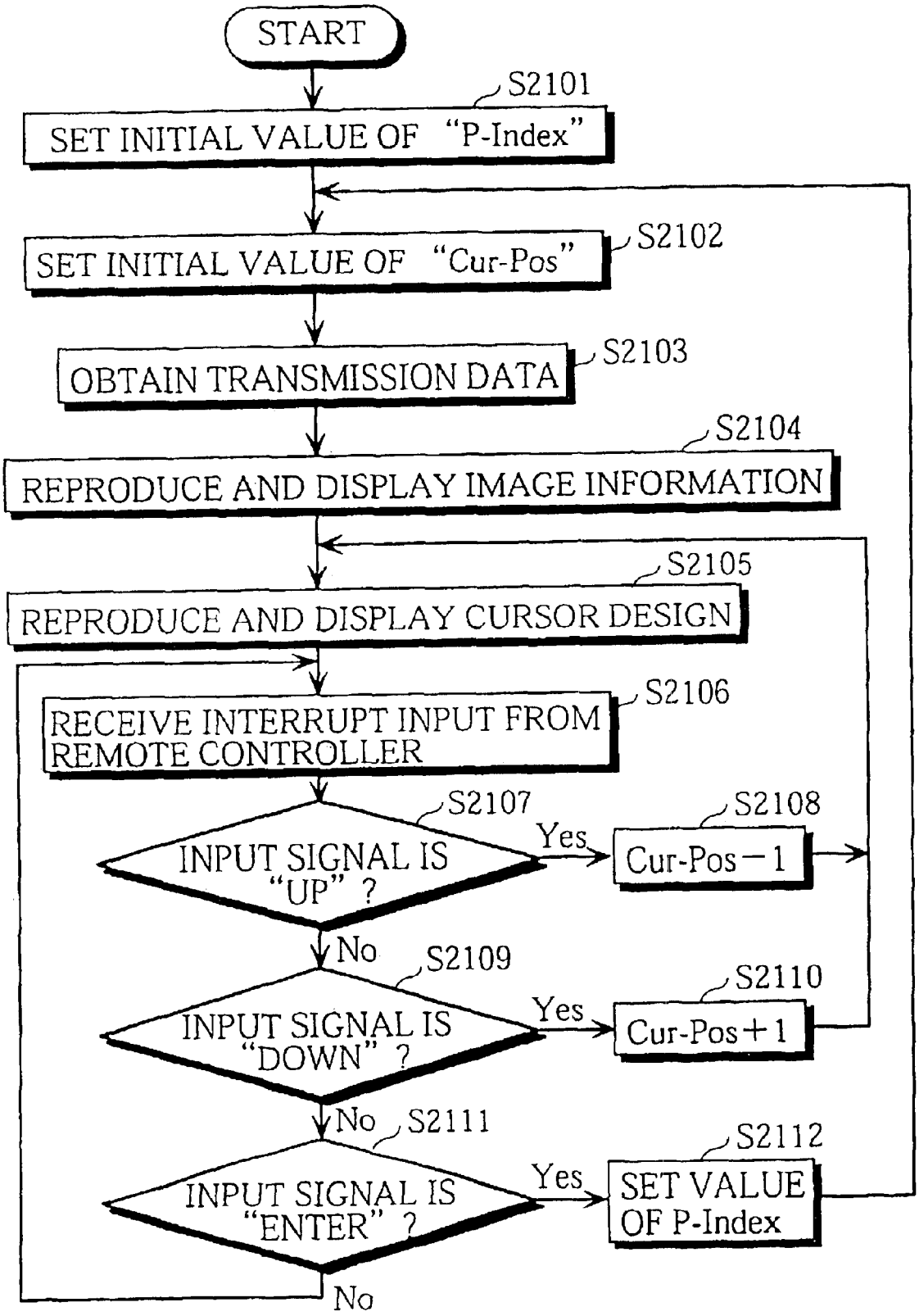
FIG. 21 is a flowchart showing an example procedure for display control which is performed by the control unit in the first embodiment.

FIG. 21 is a flowchart showing an example procedure for display control which is performed by the control unit 155.

The control unit 155 first sets the initial value of the variable P-Index which indicates the identification number of the transmission data to be obtained (step The control unit 155 then sets the initial value of the variable Cur-Pos which indicates the cursor number of the cursor in the selection state for the start of display of each display screen (step S2102).

The control unit 155 then instructs the separating unit 151 to obtain the transmission data which has the identification number indicating by the variable P-Index. The separating unit 151 then separates the display image information and link information in accordance with the indication from the control unit 155, and stores the display image information and link information with their identification number in the received data holding unit 152 (step S2103).

On being instructed by the control unit 155, the reproducing unit 153 reproduces the display image information in the received data holding unit 152 and outputs it to the display unit 154. When there is audio information which is related to the display image information, the reproducing unit 153 reproduces this audio information and outputs it to the audio output unit 157 (S2104).

The control unit 155 interprets the link information in the received data holding unit 152 and outputs the design information for the cursor designs together with the X-Y coordinates for the display positions of the cursors, as well as an instruction to display the design information to the reproducing unit 153. The reproducing unit 153 reproduces the design information inputted from the control unit 155 and outputs it to the display unit 154 (step S2105). By doing so, one display image is displayed by the display unit 154.

The control unit 155 waits for an interrupt from the signal receiving unit 156 (step S2106), and on receiving an interrupt, checks whether the input signal held by the signal receiving unit 156 is "Up" (step S2107).

If the input signal is "Up", the control unit 155 subtracts "1" from the value of the variable Cur-Pos (step S2108). If not, the control unit 155 checks whether the input signal held by the signal receiving unit 156 is "Down" (step S2109).

If the input signal is "Down", the control unit adds "1" to the value of the variable Cur-Pos (step S2110). If not, the control unit 155 checks whether the input signal held by the signal receiving unit 156 is "Enter" (step S2111)

If the input signal in "Enter", the control unit 155 uses the cursor number shown by the variable Cur-Pos to reference the cursor design correspondence table and so finds the cursor display position (X,Y) which it then uses to find the value of the identification number of the link destination file in the hot spot information. The control unit 155 then sets this identification number as the value of the variable P-Index. After this, the processing returns to S2102.

If the input signal is not "Enter", the processing returns to S2106.

As described above, in the present embodiment the display image information, which conventionally would have had to have been generated by the data receiving apparatus 150 while the data receiving apparatus 150 is interpreting the control information, is generated and transmitted by the data transmitting apparatus 110, which reduces the load of each data receiving apparatus 150. Also, when compared with the large number and variety of display control processes for display character strings which were conventionally written into the control information, the link information of the present embodiment contains a smaller number and less variety of control processes. As a result, simulated bidirectional communication can be easily achieved by the data receiving apparatuses 150 using this link information.

The present embodiment describes the case when in order to display WWW home pages on the Internet, the data communication system 100 uses a one-to-many TV broadcast to perform simulated bidirectional communication, so that when compared to the case when home pages are displayed by a browser on a personal computer, the display of the user's desired pages on the display unit 154 can be performed at a high speed which is unaffected by congestion. Since display image information is sent in a conventional TV format, the display of full color, high-resolution images can easily be achieved by the display unit 154. Also, while the display of display images generated by a browser for display on a TV monitor does not make full use of the components, such as the reproduction processing for display images, conventionally provided inside a TV, the present embodiment can achieve simulated bidirectional communication which makes full use of circuitry, such as memory and decoders, conventionally provided inside a TV set.

In the present embodiment, while the information to be obtained has been described as HTML documents which are used on the WWW together with compressed image information in GIF format and audio information in AU format, information expressed in other formats or languages, such as HyperCards, can be used. In such case, the processing for "<A>" tags refer to a method for conversion for the corresponding format and language. The present embodiment also describes the conversion of an HTML document containing only a limited number of tags, although other HTML tags may also be included.

The present embodiment also describes an example where the control for simulated bidirectional communication performed according to the link information is the switching of the display to another display image, although other processes, such as a process for flashing display on the screen, a process for scrolling the display image, or a process for activating a device such as a fax, telephone, or video recorder connected to the data receiving apparatus, may be performed in addition to simulated bidirectional communication.

The data communication system 100 is also described as having identification numbers of files written into the link information by the transmission data generating unit 112, although this process need not to be performed. As one alternative, the original file name may be written into the link information as the file identification number. When doing so, the file name can be attached to the display image information (including audio information) and link information in each set of transmission data during transmission, with the data receiving apparatus 150 which receives this information successively obtaining a complete set of link information after being switched on, so that it can then investigate the correspondence between file names and identification numbers.

The data receiving apparatus 150 may also store a complete set of display image information and link information which are repeatedly transmitted by the data transmitting apparatus 110 in the received data holding unit 152.

When the transport stream shown in FIG. 11B is transmitted from the data transmitting apparatus 110, the receiving apparatus 150 may first have the separating unit 151 separate and obtain the PMT, before reading the PMT to find the PID of the display image information to be obtained and having the display image information separated and obtained from the transport stream with the read PID as a filter condition. It may also read the PID of the private stream including the link information from the PMT, and then separate and obtain the link information from the transport stream with the PID and the identification number (table ID extension) as the filter conditions.

The transport stream shown in FIG. 11B was also described as having a video elementary stream made up of I pictures, although the video elementary stream may include B pictures and P Pictures. The display image information was also described as being encoded according to MPEG2 standard, although it may alternatively be encoded under another standard, such as MPEG1, JPEG, or GIF. Finally, the display image information and audio information were described as being transmitted as a video elementary stream and an audio elementary stream, although they may be multiplexed as private sections in the same way as the link information.

Second Embodiment

Figure 22:
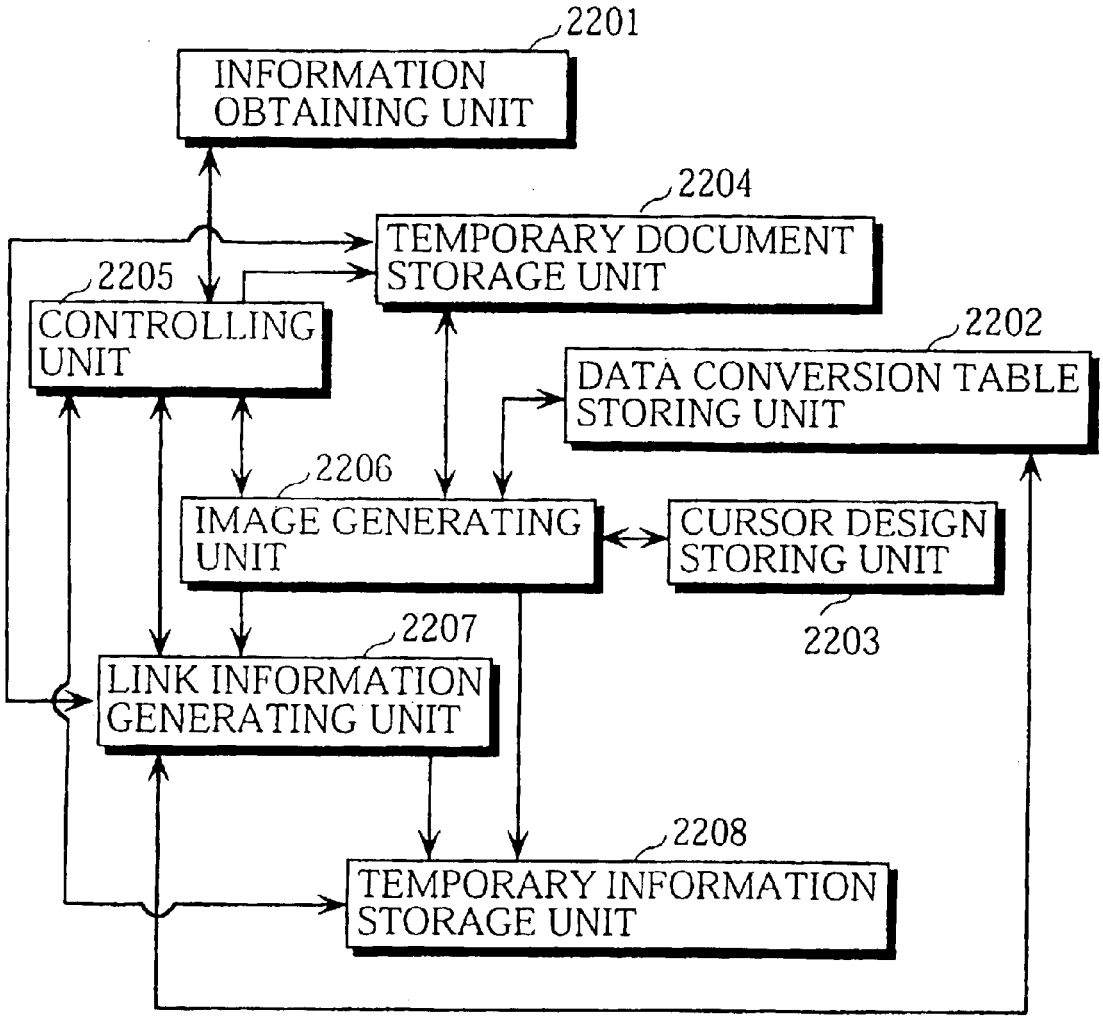
FIG. 22 shows the construction of the data conversion apparatus in the second embodiment of the present invention.

FIG. 22 shows the construction of the data conversion apparatus in the second embodiment of the present invention used in a data communication system. Note that the construction of the data communication system is the same as that of the first embodiment.

The data conversion apparatus includes information obtaining unit 2201, data conversion table storing unit 2202, cursor design storing unit 2203, temporary document storage unit 2204, controlling unit 2205, image generating unit 2206, link information generating unit 2207, and temporary information storage unit 2208.

The data conversion apparatus of the present embodiment is equal to information obtaining unit 111 and transmission data generating unit 112 of the first embodiment. Information obtaining unit 2201 is connected to an external database, and controlling unit 2205 is connected to transmission data holding unit 1103.

In the first embodiment, the cursor designs are expressed by cursor information which is held inside the control unit 155 of data receiving apparatus 150. In the second embodiment, however, the cursor designs are included in image information and transmitted from transmitting unit 116 of data transmitting apparatus 110.

Figures 24, 25:
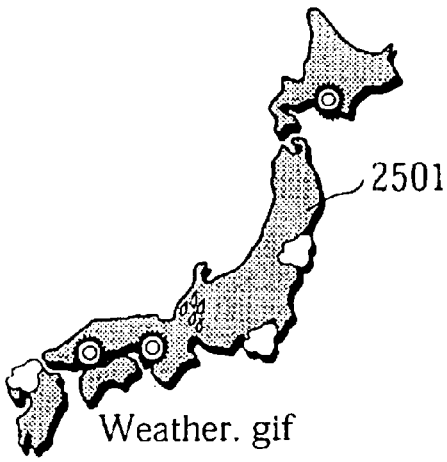
FIG. 24 shows an example document stored in the information obtaining unit in the second embodiment.
FIG. 25 shows an example image stored in the information obtaining unit in the second embodiment.

Information obtaining unit 2201 obtains multimedia data from the external database and stores the obtained data. The multimedia data, for example, includes HTML documents 2301 and 2401 and image 2501 as shown in FIG. 25, where image 2501 is compressed under GIF format.

Figure 26:
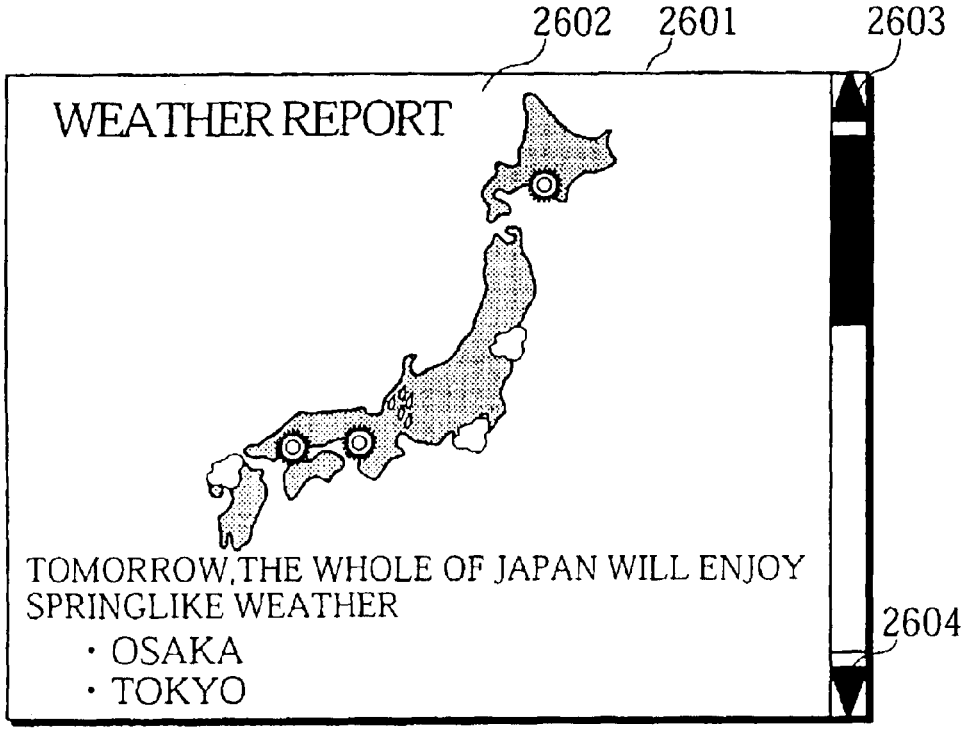
FIG. 26 shows the image of FIG. 23 displayed on the display screen by using a conventional WWW browser.
Figure 27:
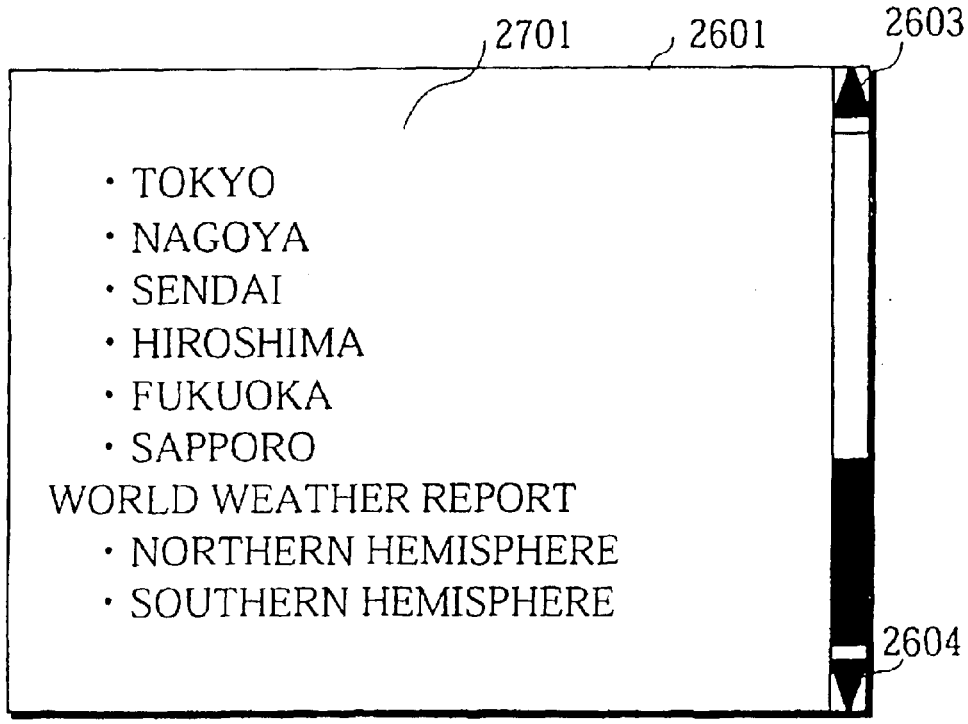
FIG. 27 shows the image of FIG. 23 displayed on the display screen by using a conventional WWW browser.

HTML documents 2301 and 2401 and image 2501 are not described here since they have already been described in the first embodiment. FIGS. 26 and 27 show HTML document 2301 and image 2501 displayed by a conventional WWW browser on display screen 2601 of a personal computer having a resolution of 640×480 dots (pixels). Document 2301 is displayed as an image over two screens, namely consecutive display images 2602 and 2701. The two display images can be scrolled in the vertical direction by operating on scroll buttons 2603 and 2604 which are respectively displayed on the upper-right and lower-right corners of the screen.

Data conversion table storing unit 2202 has a data conversion table for converting a multimedia document, which has been read from information obtaining unit 2201, into the data format suitable for transmission data holding unit 113.

The data conversion table includes a tag table (not shown in the drawings), font table 2801 as shown in FIG. 28, and link information conversion table 2901 as shown in FIG. 29.

The tag table stores information used for interpreting the tags included in HTML document 2361 as shown in FIG. 23, where HTML documents are written in HTML. The tag table has already been described in the first embodiment with reference to FIGS. 2 and 4.

Font table 2801 includes the x-y coordinates of starting point 2803 of a character string which corresponds to tag 2802 in HTML document 2301. Font table 2801 also includes font size 2804 for the character string. The x-y coordinates and font size 2804 are represented by pixels.

Link information conversion table 2901 includes conversion information 2902 and 2903 for generating the link information. Conversion information 2902 indicates that "file name" in HTML document 2301 should be converted to "Index file name".

Conversion information 2903 indicates that tag <A>including "file name" as a link destination should be converted to "Hotspot(M file name)," where "M" is a number corresponding to the number of conversions.

Figures 30, 31:
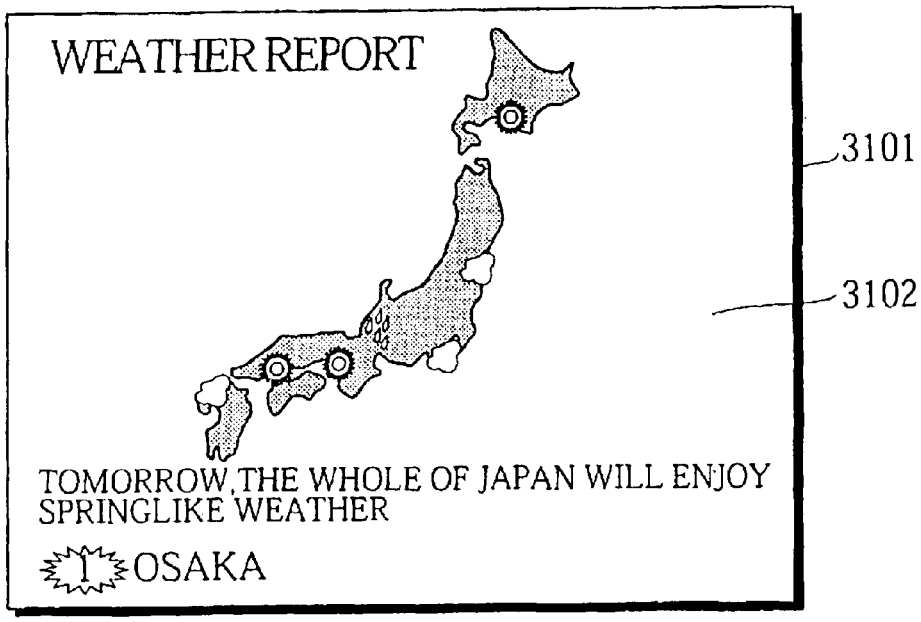
FIG. 30 shows a list of cursor designs stored in the cursor design storing unit.
FIG. 31 shows an example image having been converted and stored in the temporary information storage unit in the second embodiment.

Cursor design storing unit 2203 stores cursor design table 3001 as shown in FIG. 30. Cursor design table 3001 includes columns for index number 3002 and cursor design 3003. Index number 3002 is assigned to each of the HTML documents linked to an HTML document. In the present embodiment, seven HTML documents are linked to HTML document 2301. Cursor design 3003 is displayed at the front of a hot spot indicating a link destination. The numeral included in cursor design 303 matches corresponding index number 302.

Temporary document storage unit 2204 stores a document among the documents stored in information obtaining unit 2201 and an image. Temporary document storage unit 2204 stores, for example, HTML document 2301 as shown in FIG. 23 and image 2501 as shown in FIG. 25.

Controlling unit 2205, on receiving from an external unit an instruction for generating reproduction information, reads a document from information obtaining unit 2201, stores the document in temporary document storage unit 2204, and activates image generating unit 2206 and link information generating unit 2207. Controlling unit 2205, on receiving from image generating unit 2206 an instruction for writing data into transmission data holding unit 113, reads an image from the image storage area of temporary information storage unit 2208, writes the image into display image storing unit 123, reads a piece of link information from the link information storage area, and writes the piece of link information into link information storing unit 125. In this process, the same identification number is given to both the image and the piece of link information so that both are identified as a pair.

Controlling unit 2205, on receiving an instruction for storing an image specified by image generating unit 2206 into temporary document storage unit 2204, reads the specified image and stores the image into temporary document storage unit 2204.

Image generating unit 2206, when activated by controlling unit 2205, allocates an image storage area in temporary information storage unit 2208 for storing an image with the size of a screen, then allocates a link information storage area related to this image storage area.

Image generating unit 2206, after allocating the image storage area in temporary information storage unit 2208, reads a tag table (not shown in the drawings) and font table 2801 from data conversion table storing unit 2202, and converts character strings and images of the document stored in temporary document storage unit 2204 into an image to be displayed. The process of the conversion has been described in the first embodiment in relation to transmission data generating unit 112.

Image generating unit 2206, on reading tag <IMG>2304, instructs controlling unit 2205 to fetch image file "Weather.gif" into temporary document storage unit 2204.

Image generating unit 2206, on reading tag <A>2305, notifies link information generating unit 2207 of the file name as a link destination. Image generating unit 2206, on receiving an "M" value from link information generating unit 2207, obtains a cursor design 3003 corresponding to the "M" value (index number) by referring to cursor design table 3001. Image generating unit 2206 then calculates coordinate values (Xst,Yst) of a display position of the display element (character string or image) of the HTML document, which is also used as a cursor position. The coordinate values (Xst,Yst) indicate a point at the upper-left corner of the display element block. Value Xst is determined as "10" from x=10 included in font table 2801, "X" indicating the starting position of tag <L1>. Value Yst is obtained by adding up the number of pixels in Y-coordinate direction before the tag <A>.

For character string "OSAKA" included in tag <A>2305 as shown in FIG. 23, Xst=0 and Yst=10+80+(270)+60=420, where the numeral in parentheses "()" indicates the number of pixels in Y-coordinate direction of image file "Weather.gif" as a display image. Note that the image file "Weather.gif" as a display image is 360×270 pixels in size. Accordingly, coordinate values (Xst,Yst) are calculated as (10,420).

Image generating unit 2206 writes the obtained cursor design 3003 at the start of (Xst,Yst) in the image storage area in temporary information storage unit 2208, then writes a character string after the cursor design. FIG. 31 shows image information 3102 which is generated from HTML document 2301 as shown in FIG. 23 and is stored in image storage area 3101.

Image generating unit 2206, when image information 3102 is written into image storage area 3101, newly assigns only image storage area 3201 (see FIG. 32) in temporary information storage unit 2208. Image generating unit 2206 then analyzes HTML document 2301 and writes the image into image storage area 2301. Image generating unit 2206, on recognizing that HTML document 2301 has been analyzed, instructs controlling unit 2205 to write data into transmission data holding unit 113.

Link information generating unit 2207, when activated by controlling unit 2205, reads a file name of a file stored in temporary document storage unit 2204, such as "Report.html," by referring to link information conversion table 2901 of data conversion table storing unit 2202.

Link information generating unit 2207 sets counter M, which is used as index number 3002, to "1" when "file name" is converted into "index(file name)." Link information generating unit 2207, on receiving the contents of tag <A>2305 from image generating unit 2206, sends the value of counter M to image generating unit 2206, generates a piece of link information according to conversion information 2903 in link information conversion table 2901, stores the generated piece of link information in the link information storage area in temporary information storage unit 2208, and increments the value of counter M. After this, the value of counter M, or index number 3002, is inserted at the front of the file name in the piece of link information.

Temporary information storage unit 2208 temporarily stores the image generated by image generating unit 2206 and the piece of link information generated by link information generating unit 2207. FIGS. 31 and 32 show images 3101 and 3102 generated from HTML document 2301 as shown in FIG. 23. FIG. 33 shows link information 3301 which commonly corresponds to images 3102 and 3202.

Figure 34:
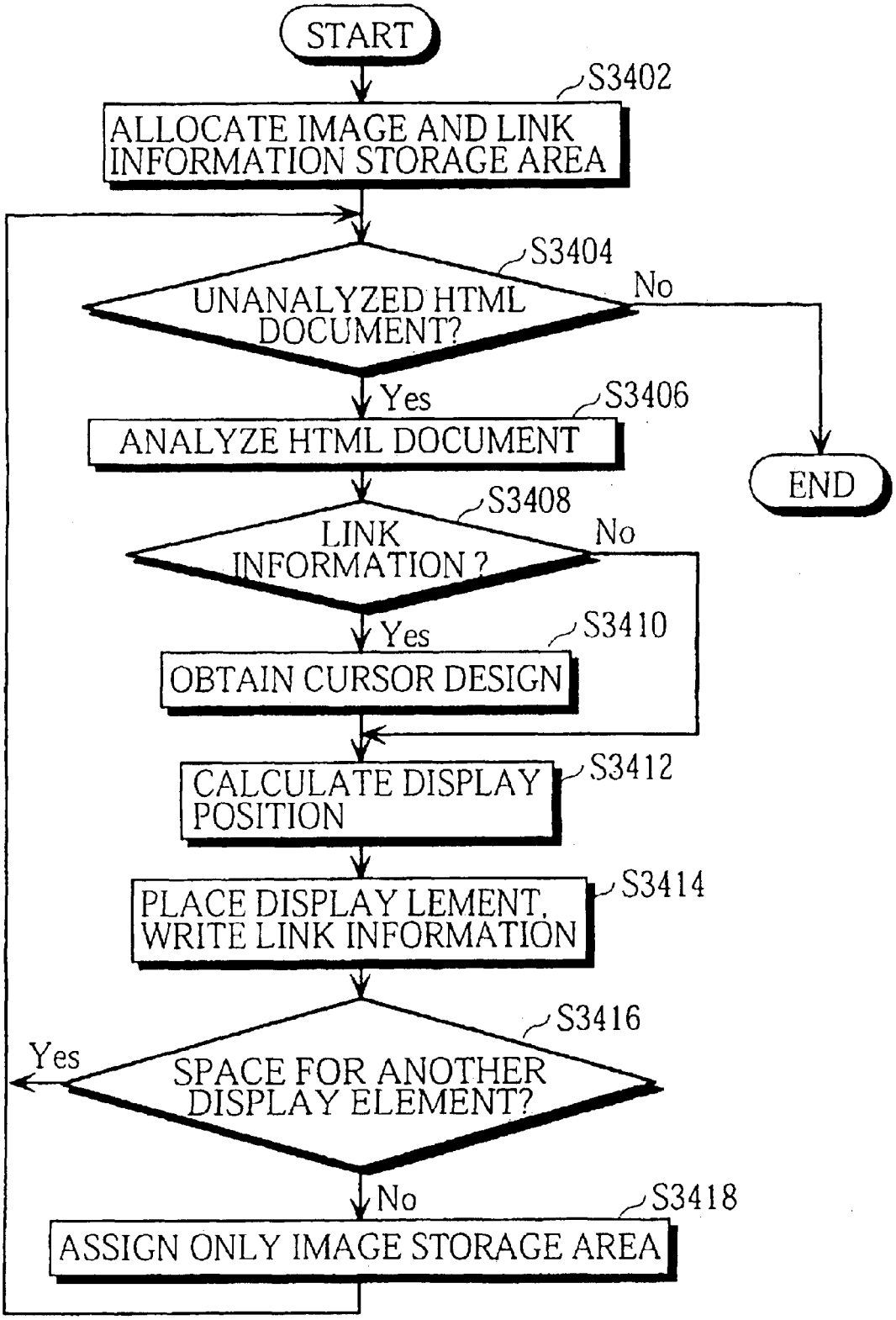
FIG. 34 is a flowchart of the operation in the second embodiment.

Now, the operation of the present embodiment is described with reference to the flowchart of FIG. 34.

When controlling unit 2205 receives an instruction for generating an image from an external element, image generating unit 2206 allocates an image storage area and a link information storage area in temporary information storage unit 2208 for storing an image with the size of a screen (S3402).

Image generating unit 2206 then judges whether an unanalyzed HTML document is stored in temporary document storage unit 2204 (S3404). If stored, image generating unit 2206 analyzes the HTML document (S3406); if not, controlling unit 2205 reads image information and link information from temporary information storage unit 2208, writes them into transmission data holding unit 113 as a pair, and ends processing.

Image generating unit 2206 judges whether the analyzed HTML document is link information (control information including tag <A>) (S3408). If it is, image generating unit 2206 obtains a certain cursor design from cursor design storing unit 2203 (S3410); if not, control goes to S3412. At S3412, image generating unit 2206 calculates a display position of the display element in the HTML document (S3412), and places the display element at the display position. If it is judged that the HTML document is link information at S3408, image generating unit 2206 inserts the cursor design at the display position before the display element, and link information generating unit 2207 writes link information into the link information storage area (S3414). Image generating unit 2206 judges whether the image storage area has a space for storing another display element (S3416). If it has, control returns to S3401; if it does not, image generating unit 2206 assigns only the image storage area in temporary information storage unit 2208 (S3418), and control returns to S3404.

Third Embodiment

Figure 35:
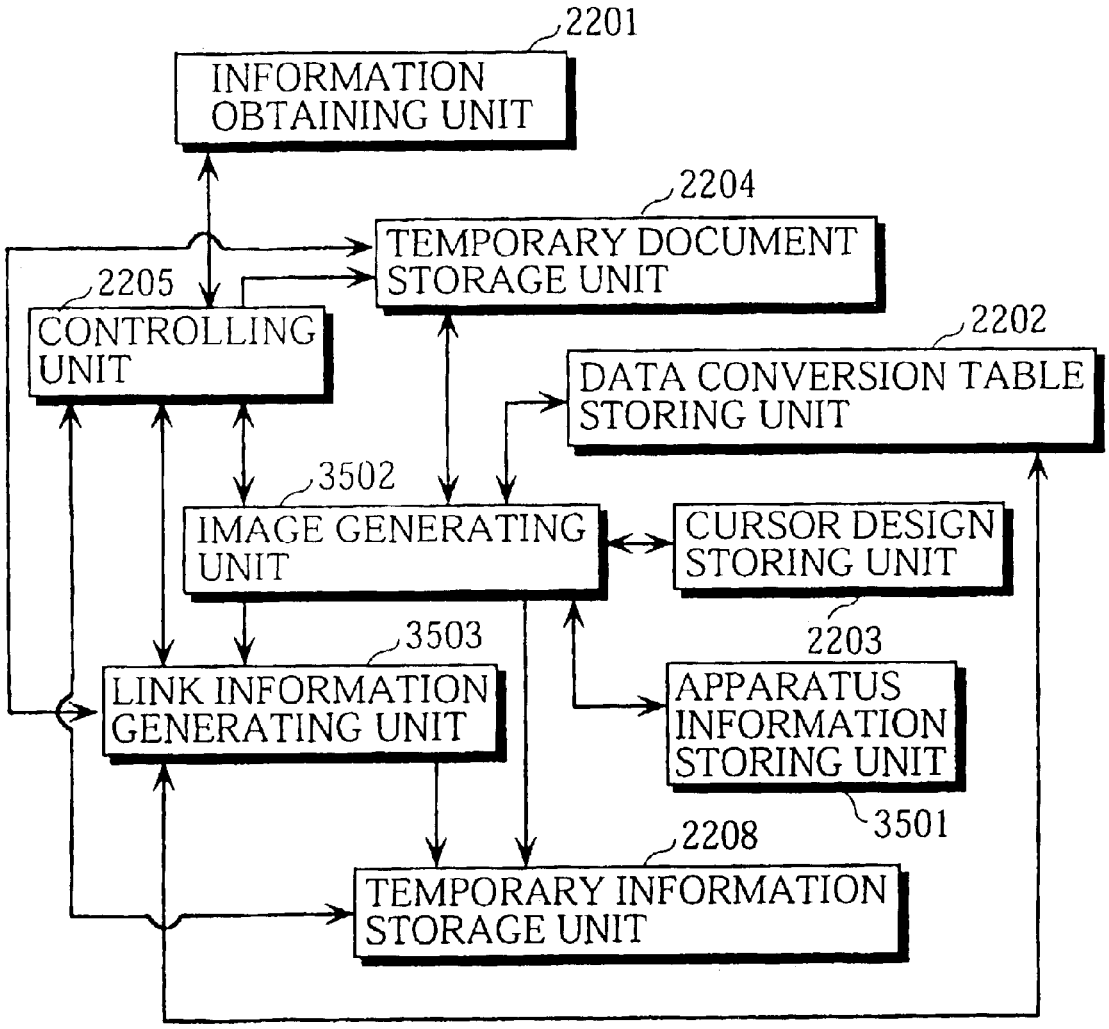
FIG. 35 shows the construction of the data conversion apparatus in the third embodiment of the present invention.

FIG. 35 shows the construction of the data conversion apparatus in the third embodiment of the present invention used in a data communication system. The data conversion apparatus includes information obtaining unit 2201, data conversion table storing unit 2202, cursor design storing unit 2203, apparatus information storing unit 3501, temporary document storage unit 2204, controlling unit 2205, image generating unit 3502, link information generating unit 3503, and temporary information storage unit 2208. Of these, the same elements as those of the second embodiment are not described here. The following is a description of the elements unique to the third embodiment.

Figure 36:
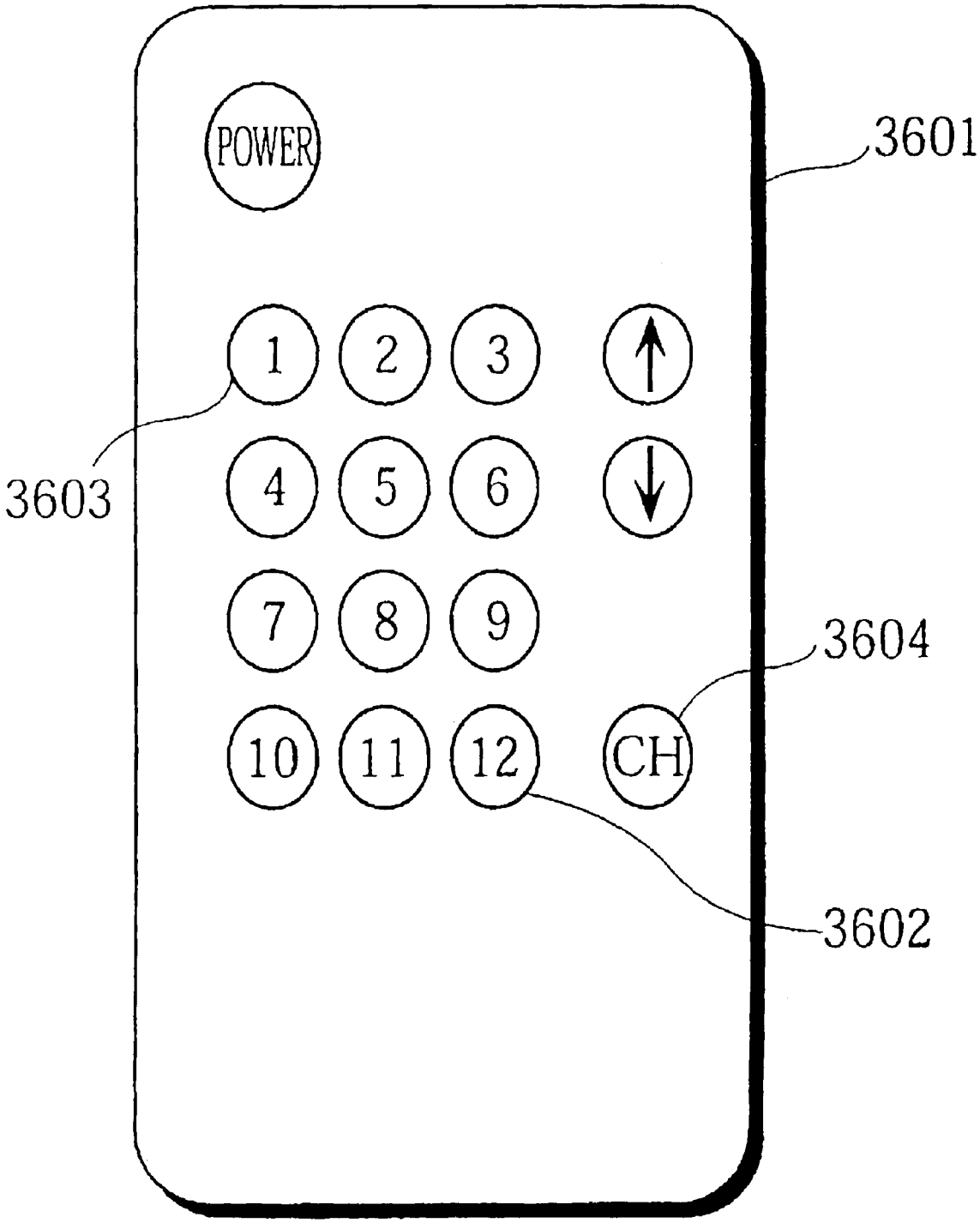
FIG. 36 shows a remote controller which transmits signals to the signal receiving unit described in the third embodiment.

FIG. 36 shows remote controller 3601 for transmitting signals to signal receiving unit 156, which has been described in the first embodiment. Remote controller 3601 includes 12 numeral buttons. Of these, six buttons "1" to "6" are used for specifying a cursor design.

Apparatus information storing unit 3501 stores "k," which represents the maximum number of cursor designs that can be displayed in one screen, where the cursor designs are used to identify link destination files. In the present embodiment, k is "6" since six buttons are used for specifying the cursor designs.

Controlling unit 2205 notifies image generating unit 3502 and link information generating unit 3503 of a completion of writing when controlling unit 2205 has written an image and a piece of link information into display image information storing unit 123 and Slink information storing unit 125 respectively. Controlling unit 2205 also includes the functions described in the second embodiment.

Figure 37:
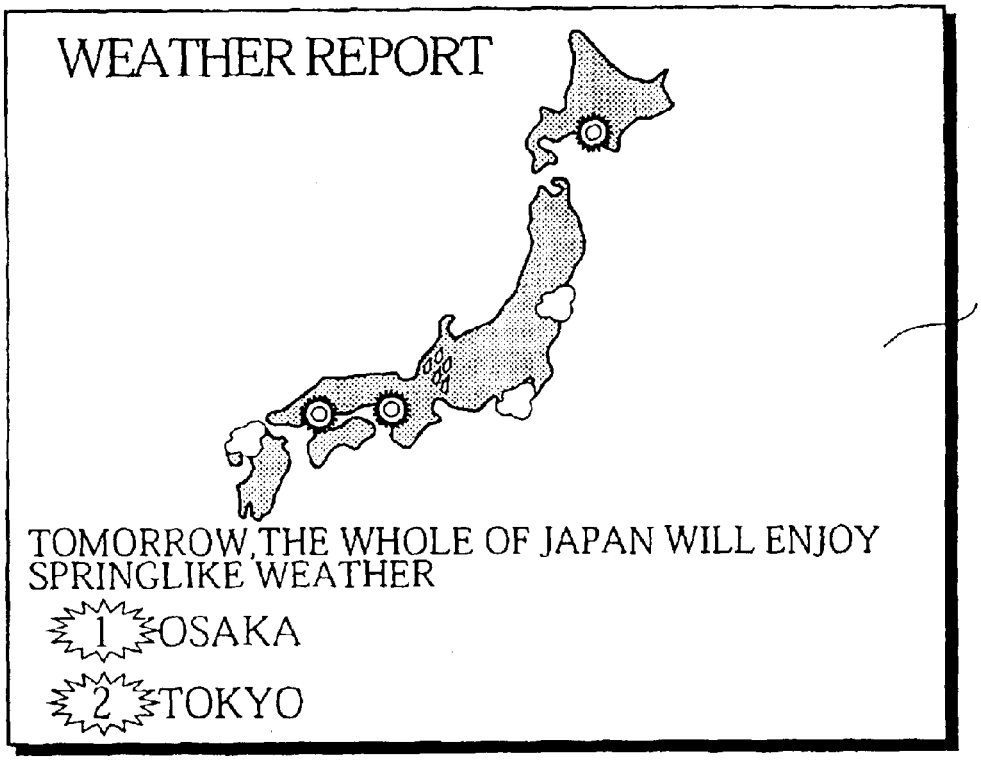
FIG. 37 shows an image and a piece of link information stored in the temporary information storage unit in the third embodiment.

Image generating unit 3502 recognizes the number of tags <A> in HTML document 2301 from the value of counter M sent from link information generating unit 3503. Image generating unit 3502 also includes the functions of image generating unit 2206 described in the second embodiment. FIG. 37 shows image 3701 which is obtained by converting image file "Weather.gif" in HTML document 2301 into a display image, image 3701 being 360×210 pixels in size. Image generating unit 3502, after generating an image for one screen, instructs controlling unit 2205 to write the image into transmission data holding unit 113.

Image generating unit 3502 judges whether the value of counter M, which is sent from link information generating unit 3503, matches the value of k in apparatus information storing unit 3501. When they match, image generating unit 3502 writes the corresponding cursor design and the display element into temporary information storage unit 2208, then instructs controlling unit 2205 to write the cursor design and the display element into transmission data holding unit 113. In this way, image 3801 as shown in FIG. 38 is generated, where the number of pieces of link information does not exceed k in apparatus information storing unit 3501.

Figure 39:
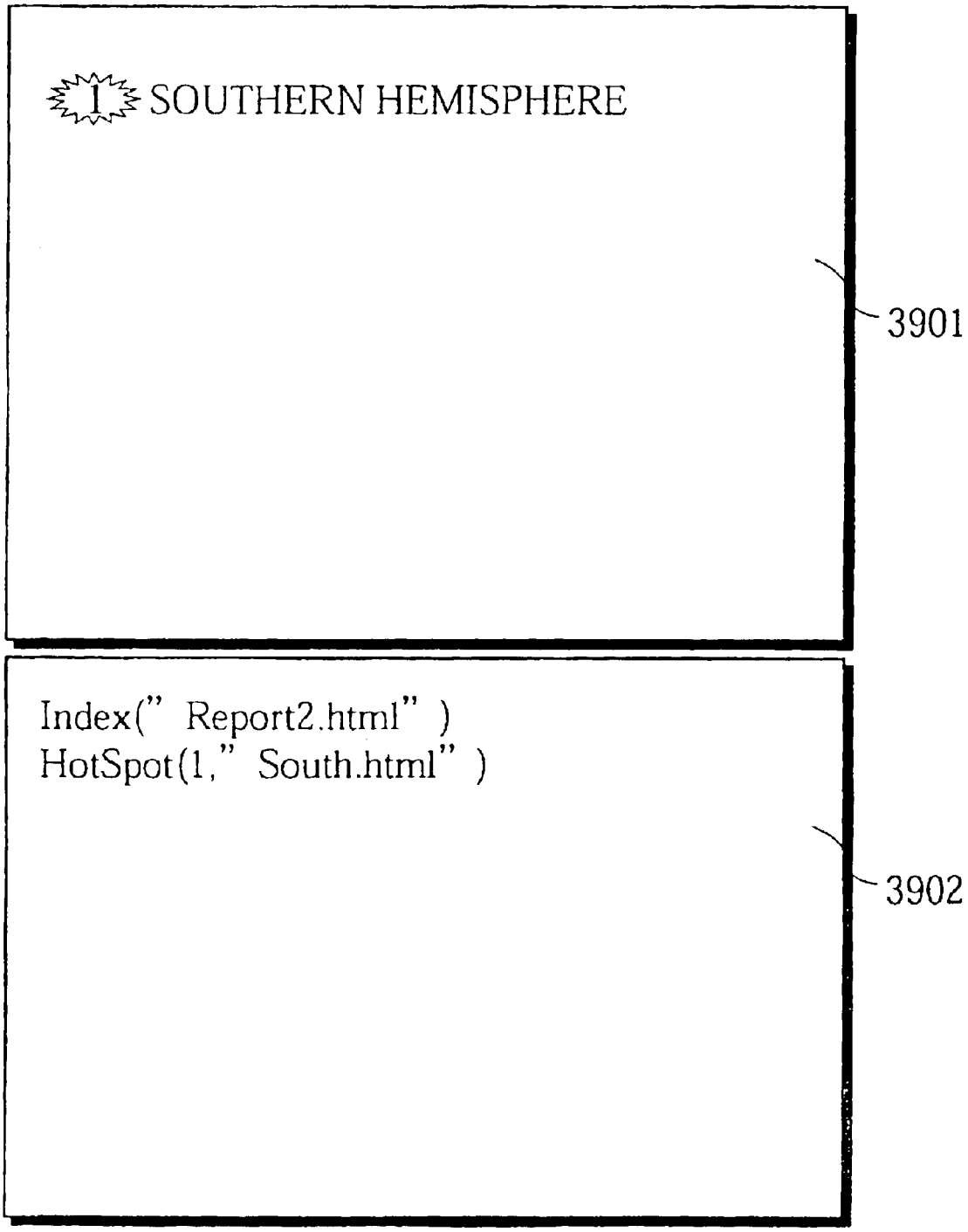
FIG. 39 shows an image and a piece of link information stored in the temporary information storage unit in the third embodiment.

FIG. 39 shows image 3901 which is generated by converting the display element in HTML document 2301 into a display image.

Link information generating unit 3503 includes the functions of link information generating unit 2207 described in the second embodiment. Link information generating unit 3503 also includes following functions unique to the present embodiment. Link information generating unit 3503, on being activated by controlling unit 2205, sets counter N to "0." Link information generating unit 3503, on receiving a notification of a completion of writing from controlling unit 2205, adds "1" to counter N. When counter N has a value other than "0," link information generating unit 3503 changes the link information to "Index ("ReportN.htm") ."Link information generating unit 3503 sets counter M to "1" when link information generating unit 3503 sets counter N to "0," then increments the value of counter M every time the value of counter N is incremented.

In the above-described process, pairs of image 3701 and link information 3702, image 3801 and link information 3802, and image 3901 and link information 3902 are generated.

Suppose channel 12, among a plurality of broadcasting channels received by display unit 154, is assigned to an Internet broadcasting, and that the button "12" on the remote controller specifies channel 12. When signal receiving unit 156 receives the signal of button "12" from the remote controller during a reproduction of a general TV broadcasting channel, image 3701 as shown in FIG. 37 is read from temporary information storage unit 2208 and is displayed on display unit 154. Here, if button "1" is pressed on the remote controller, hot spot 1 OSAKA is selected, and the screen displays the image of HTML document "Osaka.html" 2401. To return to the general TV broadcasting channel, button CH 3604, then, one buttons "1" to "11" is pressed.

Figure 40:
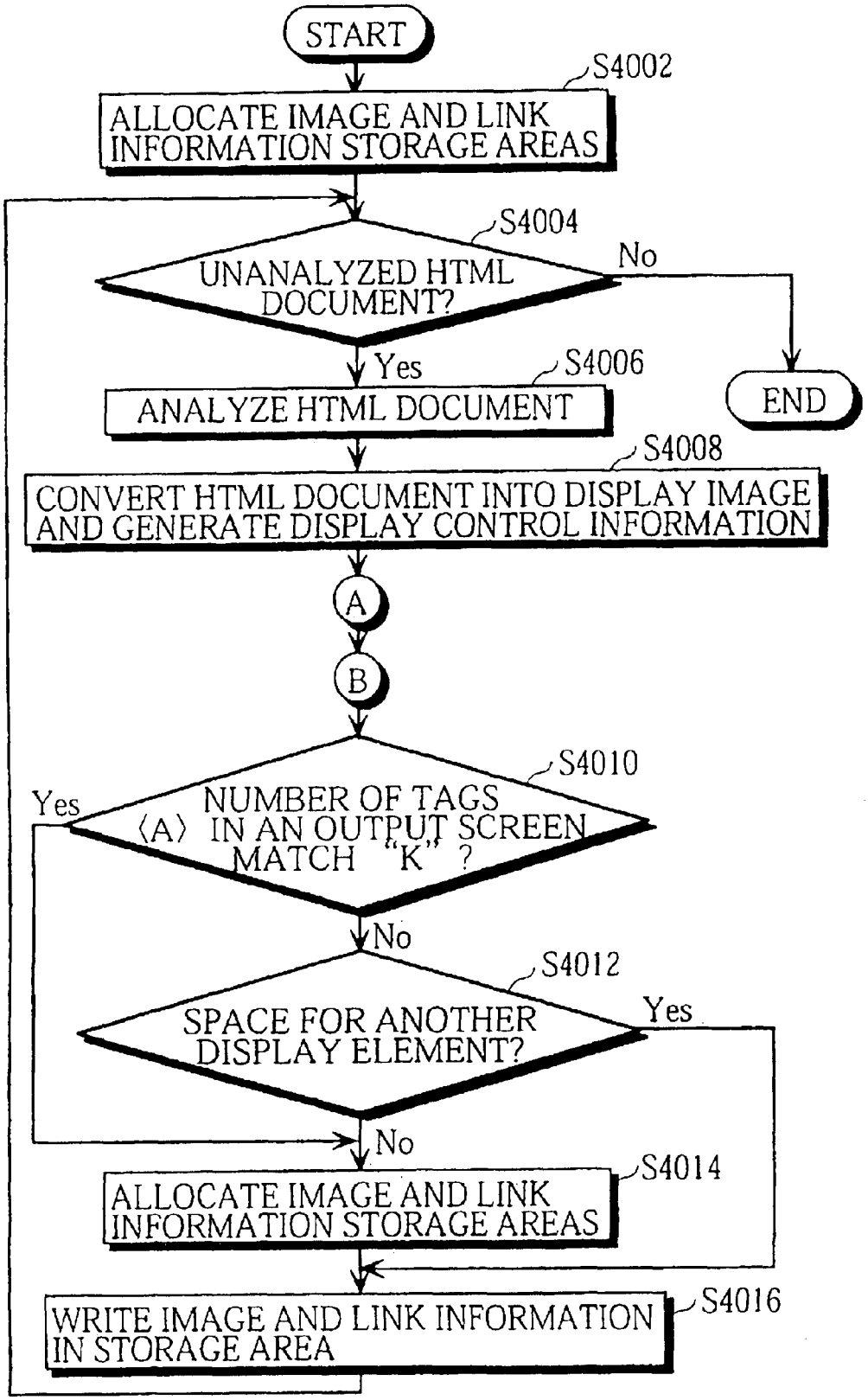
FIG. 40 is a flowchart of the operation in the third embodiment.

Now, the operation unique to the third embodiment is described with reference to the flowchart as shown in FIG. 40. Image generating unit 3502 assigns an image storage area and a link information storage area in temporary information storage unit 2208 to a display image (S4002). It is judged whether temporary document storage unit 2204 stores an unanalyzed HTML document (S4004). Image generating unit 3502 then judges whether an unanalyzed HTML document is stored in temporary document storage unit 2204 (S4004). If stored, image generating unit 3502 analyzes the HTML document (S4006); if not, controlling unit 2205 reads image information and link information from temporary information storage unit 2208, writes them into transmission data holding unit 113 as a pair, and ends processing.

The HTML document analyzed at S4006 is converted into a display image, and display control information is generated (S4008). Image generating unit 3502 judges whether the value of counter M, which, being sent from link information generating unit 3503, indicates the number of tags <A>in an output screen, matches the value of k in apparatus information storing unit 3501 (S4010). If they match, image generating unit 3502 instructs controlling unit 2205 to read information from temporary information storage unit 2208 and write it into transmission data holding unit 113, and, on receiving a notification of a completion of writing from controlling unit 2205, assigns an image storage area and a link information storage area in temporary information storage unit 2208 to a display image (S4014); if they do not match, image generating unit 3502 judges whether the image storage area has a space for storing another display element (S4012). If it has, image generating unit 3502 writes the generated image into the storage area, and link information generating unit 3503 writes the link information into the storage area (S4016), then control returns to S4004.

As shown in the above description, the third embodiment discloses a method of generating images and link information with which the user can specify a hot spot on the display screen by pressing a button on the remote controller.

In the third embodiment, "k" being the maximum number of cursor designs that can be stored in apparatus information storing unit 3501 is set to the number of buttons on remote controller 3601 corresponding to the cursor designs. However, "k" may be determined by considering the resolution of the screen of display unit 154 so that the user can easily discern the link destinations.

Fourth Embodiment

The construction of the data conversion apparatus in the fourth embodiment is almost the same as that of the third embodiment, except that image generating unit 3502 additionally has a function of considering the arrangement of the character strings of tags <A>between tags <UL>and </UL>.

Now, the construction of the data conversion apparatus unique to the fourth embodiment is described.

Image generating unit 3502, during the analysis of HTML document 2301 as shown in FIG. 23, converts all the character strings or signs between a pair of tag <UL>2306 and tag </UL>2307 into display images. Image generating unit 3502 judges whether all the converted character strings such as OSAKA, TOKYO, NAGOYA, SENDAI, HIROSHIMA, FUKUOKA, and SAPPORO can be stored in the image storage area. If they can, starting from tag <A>2305 which follows tag <UL>2306, the character strings are converted into display images; if they cannot, image generating unit 3502 judges whether all the converted character strings can be stored in the image storage area by assigning another image storage area. If they cannot, the same processing as that of the third embodiment follows; if they can, image generating unit 3502 judges whether the number of tags <A>between tag <UL>2306 and tag </UL>2307 exceeds "k." If it exceeds, the same processing as that of the third embodiment follows; if it does not, image generating unit 3502 instructs controlling unit 2205 to read information from temporary information storage unit 2208 and write it into transmission data holding unit 113, and, on receiving a notification of a completion of writing from controlling unit 2205, assigns an image storage area and a link information storage area in temporary information storage unit 2208 to perform the same processing as in the third embodiment.

In the present case, the character strings from "OSAKA" to "SAPPORO" cannot be stored in an image storage area. Thus, the image is divided into image 3701 and image 4101 as shown in FIG. 41. Character strings "NORTHERN HEMISPHERE" and "SOUTHERN HEMISPHERE" between tag <UL>2308 and tag </UL>2309, however, are included together in another image 4201 as shown in FIG. 42. Display control information 4102 and 4202 respectively corresponding to images 4101 and 4201 are generated by link information generating unit 3503.

Figure 43:
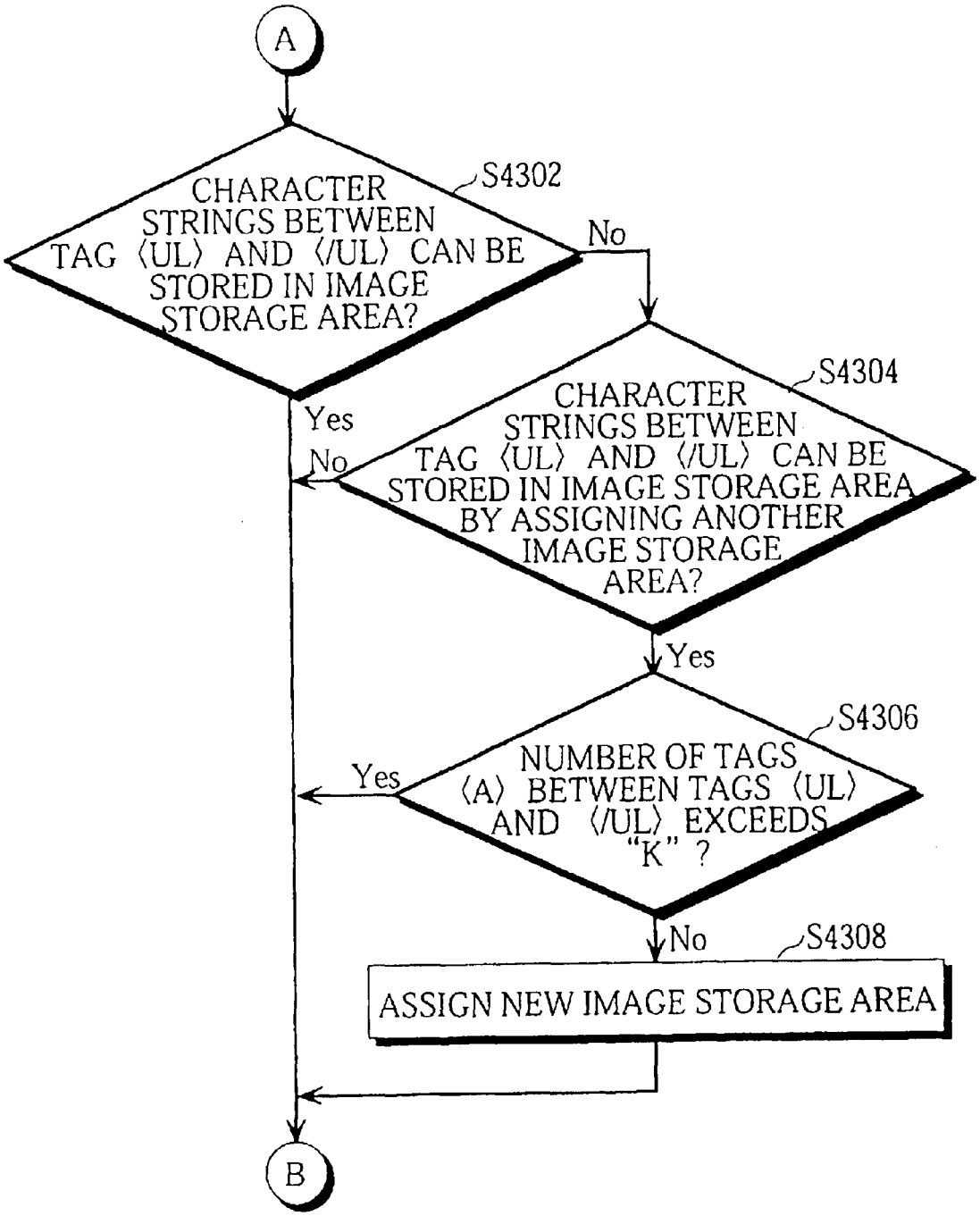
FIG. 43 is a flowchart of the operation in the fourth embodiment.

Now, the operation unique to the fourth embodiment is described with reference to the flowchart as shown FIG. 43. Image generating unit 3502 calculates the total size of the character strings between tag <UL>and tag </UL>and judges whether the character strings can be stored in an image storage area (S4302). If they cannot, image generating unit 3502 judges whether all the character strings (with the same size as calculated at S4302) can be stored in the image storage area by assigning another image storage area (S4304). If they cannot, control goes to S4010; if they can, image generating unit 3502 judges whether the number of tags <A>between tag <UL>and tag </UL>exceeds "k" (S4306). If it exceeds, control goes to S4010; if it does not, image generating unit 3502 instructs controlling unit 2205 to read information from temporary information storage unit 2208 and write it into transmission data holding unit 113, and, on receiving a notification of a completion of writing from controlling unit 2205, assigns an image storage area and a link information storage area in temporary information storage unit 2208 (S4308), then control goes to S4010.

As will be understood from the above description, the fourth embodiment enables displaying of items related to each other together on the same screen.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A data conversion apparatus which is used as a data transmitting apparatus in a data communication system, wherein the data communication system achieves pseudo interactive communications by using one-way communications between the data transmitting apparatus and a plurality of data receiving apparatuses, the data conversion apparatus comprising:

document storing means for storing a plurality of documents each of which includes at least a character string and at least a piece of image information, wherein at least one of the character string and the piece of image information includes a piece of link destination information which specifies another document as a link destination;

supplementary design storing means for storing a list of supplementary designs with serial numbers respectively related to the supplementary designs;

display image element generating means for reading the character string and the piece of image information one at a time from the document storing means and converting the character string and the piece of image information into respective display image elements, wherein the display image elements are bit-mapped graphics;

display image generating means for generating a display image which is composed of the display image elements, wherein the display image has a size which is equivalent to a size of display screens of the plurality of data receiving apparatuses;

supplementary design adding means for reading a supplementary design corresponding to the piece of link destination information specifying the other document as the link destination from the supplementary design storing means and adding the supplementary design to a corresponding display image element in the display image; and display link destination information converting means for converting the piece of link destination information specifying the other document as the link destination into a piece of display link destination information, the piece of display link destination information being related to a serial number corresponding to the supplementary design added by the supplementary design adding means, wherein the piece of display link destination information specifies, as a link destination, another display image which is a display image of the other document generated by the display image generating means.

2. The data conversion apparatus of claim 1, wherein the display image element generating means includes:

a conversion table storing unit for storing a character size of the character string; and a display image element generating unit for converting the character string into a display image element according to the character size and converting the piece of image information into a display image element.

3. The data conversion apparatus of claim 2, wherein the conversion table storing unit further stores respective starting positions in a horizontal direction of the display image elements, wherein the display image generating means includes:

a display position calculating unit for reading the starting positions of the display image elements and calculating respective display positions of the display image elements in the display image; and a display image generating unit for generating the display image by arranging the display image elements in the display image according to the display positions.

4. The data conversion apparatus of claim 3, wherein the display image generating unit generates a plurality of display sub-images from the document, wherein the display link destination information converting means includes:

a display link destination information generating unit for generating a plurality sets of pieces of display link destination information which respectively correspond to the plurality of display sub-images generated from the document.

5. The data conversion apparatus of claim 4, wherein the supplementary design storing means includes:

a maximum number storing unit for storing a maximum number of the supplementary designs in the display image, wherein the display image generating means further includes:

a maximum number judging unit for judging whether the number of the supplementary designs to be arranged in the display image exceeds the maximum number; and a display image dividing unit for, when the maximum number judging unit judges that the number of the supplementary designs exceeds the maximum number, sending an instruction to the display image generating unit to divide the display image into the plurality of display sub-images so that supplementary designs less than the maximum number are added to each of the plurality of display sub-images divided from the display image, wherein the display image generating unit generates the plurality of display sub-images according to the instruction.

6. The data conversion apparatus of claim 5, wherein the display link destination converting means further includes:

a display link destination sub-information generating unit for generating a plurality sets of pieces of display link destination sub-information which respectively correspond to the plurality of display sub-images generated by the display image generating unit.

7. The data conversion apparatus of claim 6 further comprising:

information obtaining means for obtaining, via a communication line, a document written in HTML (Hyper Text Markup Language) which includes at least a character string and at least a piece of image information; and information writing means for writing the document written in HTML into the document storing means.

8. The data conversion apparatus of claim 7 further comprising:

first storing means for storing a plurality of video frames which, each having an identifier, are the display image and the plurality of display sub-images;

second storing means for storing a plurality sets of pieces of display link destination information which are generated by the display link destination information converting means and are respectively related to the plurality of video frames, wherein each of the plurality sets of pieces of display link destination information having the same identifier as the identifier of a corresponding video frame; and broadcasting means for cyclically transmitting a certain number of video frames in the first storing means and corresponding sets of pieces of display link destination information in the second storing means.

9. The data conversion apparatus of claim 4, wherein the display image generating unit generates the plurality of display sub-images so that each of the plurality of display sub-images includes display image elements of a same category.

10. The data conversion apparatus of claim 9, wherein the document is written in HTML, wherein the display image generating unit determines categories of the display image elements from tags written in the document.

11. The data conversion apparatus of claim 10, wherein the supplementary design storing means includes:

a maximum number storing unit for storing a maximum number of the supplementary designs in the display image, wherein the display image generating means further includes:

a maximum number judging unit for judging whether the number of the supplementary designs to be arranged in the display image exceeds the maximum number; and a display image dividing unit for, when the maximum number judging unit judges that the number of the supplementary designs exceeds the maximum number, sending an instruction to the display image generating unit to divide the display image into the plurality of display sub-images so that supplementary designs less than the maximum number are added to each of the plurality of display sub-images divided from the display image, wherein the display image generating unit generates the plurality of display sub-images according to the instruction.

12. The data conversion apparatus of claim 11, wherein the display link destination converting means further includes:

a display link destination sub-information generating unit for generating a plurality sets of pieces of display link destination sub-information which respectively correspond to the plurality of display sub-images generated by the display image generating unit.

13. A data conversion apparatus which is used as a data transmitting apparatus in a data communication system, wherein the data communication system achieves pseudo interactive communications by using one-way communications between the data transmitting apparatus and a plurality of data receiving apparatuses, the data conversion apparatus comprising:

document storing means for storing a plurality of documents each of which includes at least a character string, wherein at least a character string includes a piece of link destination information which specifies another document as a link destination, supplementary design storing means for storing a list of supplementary designs with serial numbers respectively related to the supplementary designs;

display image element generating means for reading the character string from the document storing means and converting the character string into a display image element, wherein the display image element is a bit-mapped graphic;

display image generating means for generating a display image which is composed of the display image element, wherein the display image has a size which is equivalent to a size of display screens of the plurality of data receiving apparatuses;

supplementary design adding means for reading a supplementary design corresponding to the piece of link destination information specifying the other document as the link destination from the supplementary design storing means and adding the supplementary design to a corresponding display image element in the display image; and display link destination information converting means for converting the piece of link destination information specifying the other document as the link destination into a piece of display link destination information, the piece of display link destination information being related to a serial number corresponding to the supplementary design added by the supplementary design adding means, wherein the piece of display link destination information specifies, as a link destination, another display image which is a display image of the other document generated by the display image generating means.

14. The data conversion apparatus of claim 13, wherein the display image element generating means includes:

a conversion table storing unit for storing a character size of the character string; and a display image element generating unit for converting the character string into a display image element according to the character size.

15. The data conversion apparatus of claim 14, wherein the conversion table storing unit further stores a starting position in a horizontal direction of the display image element, wherein the display image generating means includes:

a display position calculating unit for reading the starting position of the display image element and calculating a display position of the display image element in the display image; and a display image generating unit for generating the display image by arranging the display image element in the display image according to the display position.

16. The data conversion apparatus of claim 15, wherein the display image generating unit generates a plurality of display sub-images from the document, wherein the display link destination information converting means includes:

a display link destination information generating unit for generating a plurality sets of pieces of display link destination information which respectively correspond to the plurality of display sub-images generated from the document.

17. The data conversion apparatus of claim 16, wherein the supplementary design storing means includes:

a maximum number storing unit for storing a maximum number of the supplementary designs in the display image, wherein the display image generating means further includes:

a maximum number judging unit for judging whether the number of the supplementary designs to be arranged in the display image exceeds the maximum number; and a display image dividing unit for, when the maximum number judging unit judges that the number of the supplementary designs exceeds the maximum number, sending an instruction to the display image generating unit to divide the display image into the plurality of display sub-images so that supplementary designs less than the maximum number are added to each of the plurality of display sub-images divided from the display image, wherein the display image generating unit generates the plurality of display sub-images according to the instruction.

18. The data conversion apparatus of claim 17, wherein the display link destination converting means further includes:

a display link destination sub-information generating unit for generating a plurality sets of pieces of display link destination sub-information which respectively correspond to the plurality of display sub-images generated by the display image generating unit.

19. The data conversion apparatus of claim 18 further comprising:

information obtaining means for obtaining, via a communication line, a document written in HTML (Hyper Text Markup Language) which includes at least a character string; and information writing means for writing the document written in HTML into the document storing means.

20. The data conversion apparatus of claim 19 further comprising:

first storing means for storing a plurality of video frames which, each having an identifier, are the display image and the plurality of display sub-images;

second storing means for storing a plurality sets of pieces of display link destination information which are generated by the display link destination information converting means and are respectively related to the plurality of video frames, wherein each of the plurality sets of pieces of display link destination information having the same identifier as the identifier of a corresponding video frame; and broadcasting means for cyclically transmitting a certain number of video frames in the first storing means and corresponding sets of pieces of display link destination information in the second storing means.

21. The data conversion apparatus of claim 16, wherein the display image generating unit generates the plurality of display sub-images so that each of the plurality of display sub-images includes display image elements of a same category.

22. The data conversion apparatus of claim 21, wherein the document is written in HTML, wherein the display image generating unit determines categories of the display image elements from tags written in the document.

23. The data conversion apparatus of claim 22, wherein the supplementary design storing means includes:

the maximum number storing unit for storing a maximum number of the supplementary designs in the display image, wherein the display image generating means further includes:

a maximum number judging unit for judging whether the number of the supplementary designs to be arranged in the display image exceeds the maximum number; and a display image dividing unit for, when the maximum number judging unit judges that the number of the supplementary designs exceeds the maximum number, sending an instruction to the display image generating unit to divide the display image into the plurality of display sub-images so that supplementary designs less than the maximum number are added to each of the plurality of display sub-images divided from the display image, wherein the display image generating unit generates the plurality of display sub-images according to the instruction.

24. The data conversion apparatus of claim 23, wherein the display link destination converting means further includes:

a display link destination sub-information generating unit for generating a plurality sets of pieces of display link destination sub-information which respectively correspond to the plurality of display sub-images generated by the display image generating unit.

25. A data conversion system for integrating Hyper Text Markup Language (HTML) documents from a source on the Internet into a format suitable for enabling a user interaction with a video broadcast receiver comprising:

a remote controller that enables a user to interact with a video display unit; and a data conversion apparatus for converting the HTML documents including, document storing means for storing a plurality of HTML documents from a source on the Internet, each of the HTML documents include at least a character string and at least a piece of image information, wherein at least one of the character string and the piece of image information includes a piece of link destination information which specifies another HTML document as a link destination;

supplementary design storing means for storing a list of supplementary designs with serial numbers respectively related to the supplementary designs;

display image element generating means for reading the character string and the piece of image information from the document storing means and converting the character string and the piece of image information into respective display image elements, wherein the display image elements are bit-mapped graphics;

supplementary design adding means for reading a supplementary design corresponding to the piece of link destination information specifying the other document as the link destination from the supplementary design storing means and adding the supplementary design to a corresponding display image element in the bit-mapped graphics;

display link destination information converting means for converting the piece of link destination information specifying the other document as the link destination into a piece of display link destination information, the piece of display link destination information being related to a serial number corresponding to the supplementary design added by the supplementary design adding means, wherein the piece of display link destination information specifies, as a link destination, another display image; and display image generating means for generating a video display image for the video display unit which is composed of the display image elements wherein the user can activate the remote controller to indicate selection of a specific supplementary design in the displayed video image to link to another display image that will be generated.

26. The data conversion system of claim 25, wherein the supplementary design storing means includes:

a maximum number storing unit for storing a maximum number of the supplementary designs in the display image, wherein the display image generating means further includes:

a display image generating unit for generating the display image by arranging the display image elements in the display image according to the display positions;

a maximum number judging unit for judging whether the number of the supplementary designs to be arranged in the display image exceeds a maximum number; and a display image dividing unit for, when the maximum number judging unit judges that the number of the supplementary designs exceeds the maximum number, sending an instruction to the display image generating unit to divide the display image into a plurality of display sub-images so that supplementary designs less than the maximum number are added to each of the plurality of display sub-images divided from the display image, wherein the display image generating unit generates the plurality of display sub-images according to the instruction.

27. The data conversion system of claim 26, wherein:

the display link destination converting means further includes:

a display link destination sub-information generating unit for generating a plurality sets of pieces of display link destination sub-information which respectively correspond to the plurality of display sub-images generated by the display image generating unit.

*28. A data conversion apparatus for use in a data communication system which achieves pseudo interactive communications by using one-way communications from a data transmitting apparatus to a plurality of data receiving apparatuses, the data conversion apparatus comprising:*

*document storing means storing a plurality of documents each of which includes one or more character strings at least one of which contains a piece of link destination information specifying another document as a link destination;*

*display image element generating means for reading the character strings one at a time from the document storing means and converting each read character into a display image element being a bit-mapped graphic;*

*display image generating means for generating a display image which is composed of generated display image elements and is to be displayed on the plurality of data receiving apparatuses as one screen; and*

*identifier adding means for adding an identifier for cursor control to each generated display image element in the display image in accordance with display position of each display image element, the identifier for controlling cursor shifting between display image elements, including shifting to any desired display image element in the display image.*

*29. The data conversion apparatus of claim 28, wherein the identifier is a number.*

*30. A data conversion apparatus for use in a data communication system which achieves pseudo interactive communications by using one-way communications from a data transmitting apparatus to a plurality of data receiving apparatuses, the data conversion apparatus comprising:*

*document storing means storing a plurality of documents each of which includes one or more character strings at least one of which contains a piece of link destination information specifying another document as a link destination;*

*display image element generating means for reading the character strings one at a time from the document storing means and converting each read character into a display image element being a bit-mapped graphic;*

*display image generating means for generating a display image which is composed of generated display image elements and is to be displayed on the plurality of data receiving apparatuses as one screen;*

*display link destination information converting means for converting each piece of link destination information into a piece of display link destination information which specifies, as a link destination, another display image which is a display image of the other document generated by the display image generating means,*

*wherein the document is written in HTML and the display image generating means determines categories of the display image elements from tags written in the document;*

*supplementary design storing means storing supplementary designs with serial numbers; and*

*supplementary design adding means for reading the supplementary designs from the supplementary design storing means one by one in order, and adding each read supplementary design to each piece of link destination information specifying the other document as the link destination, on a one-to-one basis, wherein*

*the display link destination information converting means converts each piece of link destination information into a piece of display link destination information corresponding to a serial number assigned to a supplementary design,*

*the supplementary design storing means includes:*

*a maximum number storing unit for storing a maximum number of the supplementary designs in the display image, wherein*

*the display image generating means further includes:*

*a maximum number judging unit for judging whether the number of the supplementary designs to be arranged in the display image exceeds the maximum number; and*

*a display image dividing unit for, when the maximum number judging unit judges that the number of the supplementary designs exceeds the maximum number, sending an instruction to the display image generating means to divide the display image into the plurality of display sub-images so that supplementary designs less than the maximum number are added to each of the plurality of display sub-images divided from the display image, wherein the display image generating unit generates the plurality of display sub-images according to the instruction.*

*31. A data receiving apparatus for achieving a pseudo interactive communication by receiving one-way communications from a data transmitting apparatus, the data receiving apparatus comprising:*

*display means for displaying a display image which is composed of one or more display image elements which are each a bit-mapped graphic generated from a character string which is included in a document and contains a piece of link destination information specifying another document as a link destination, wherein an identifier for focus control has been added to each display image element in the display image;*

*storage means for storing information showing positions of the one or more display image elements displayed by the display means;*

*focus means for focusing on one of the one or more display image elements displayed by the display means;*

*reception means for receiving an operation signal of a move button on a remote control; and*

*focus control means for controlling the focus and allowing another display image element to be focused on in accordance with either the identifier for focus control or the received operation signal by referring to the position information stored in the storage means.*

* * * * *

UNITED STATES PATENT AND TRADEMARK OFFICE

CERTIFICATE OF CORRECTION

PATENT NO. : RE 40,361 E
APPLICATION NO. : 09/916872
DATED : June 3, 2008
INVENTOR(S) : Yamanaka et al.

It is certified that error appears in the above-identified patent and that said Letters Patent is hereby corrected as shown below:

Title page, item [56]
In the References Cited for U.S. Patent Documents:
Reference 5,577,030, 11/1996, Oki et. al., 710/33 should be removed and replace with
Reference 5,555,380, 07/1996, Yamanaka et. al., 710/33

Signed and Sealed this

Fourth Day of November, 2008

JON W. DUDAS
*Director of the United States Patent and Trademark Office*